(12) United States Patent
Kuo et al.

(10) Patent No.: US 10,019,984 B2
(45) Date of Patent: Jul. 10, 2018

(54) SPEECH RECOGNITION ERROR DIAGNOSIS

(71) Applicant: Microsoft Technology Licensing, LLC, Redmond, WA (US)

(72) Inventors: Shiun-Zu Kuo, Bothell, WA (US); Thomas Reutter, Redmond, WA (US); Yifan Gong, Sammamish, WA (US); Mark T. Hanson, Woodinville, WA (US); Ye Tian, Kenmore, WA (US); Shuangyu Chang, Fremont, CA (US); Jonathan Hamaker, Issaquah, WA (US); Qi Miao, Kenmore, WA (US); Yuancheng Tu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/634,714

(22) Filed: Feb. 27, 2015

(65) Prior Publication Data
US 2016/0253989 A1 Sep. 1, 2016

(51) Int. Cl.
*G10L 15/01* (2013.01)
*G10L 15/183* (2013.01)

(52) U.S. Cl.
CPC ............ *G10L 15/01* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 2006/0069568 A1 | 3/2006 | Passaretti et al. | |
| 2006/0161434 A1* | 7/2006 | Faisman | G10L 15/22 704/246 |
| 2006/0230410 A1 | 10/2006 | Kurganov et al. | |
| 2007/0143107 A1* | 6/2007 | Ben-David | G10L 15/30 704/234 |
| 2009/0299741 A1* | 12/2009 | Chittar | G10L 15/01 704/233 |
| 2011/0004790 A1 | 1/2011 | Rossmann et al. | |

OTHER PUBLICATIONS

"Speech Debugging Console", Retrieved on: Oct. 13, 2014 Available at: http://msdn.microsoft.com/en-us/library/ms873315.aspx.

(Continued)

*Primary Examiner* — Tammy Paige Goddard
*Assistant Examiner* — Keara Harris

(57) ABSTRACT

Techniques and technologies for diagnosing speech recognition errors are described. In an example implementation, a system for diagnosing speech recognition errors may include an error detection module configured to determine that a speech recognition result is least partially erroneous, and a recognition error diagnostics module. The recognition error diagnostics module may be configured to (a) perform a first error analysis of the at least partially erroneous speech recognition result to provide a first error analysis result; (b) perform a second error analysis of the at least partially erroneous speech recognition result to provide a second error analysis result; and (c) determine at least one category of recognition error associated with the at least partially erroneous speech recognition result based on a combination of the first error analysis result and the second error analysis result.

20 Claims, 12 Drawing Sheets

(56) References Cited

OTHER PUBLICATIONS

Rea, Sara Morgan, "Creating .NET Applications That Talk", Published on: Apr. 1, 2005 Available at: http://www.informit.com/articles/article.aspx?p=378965&segNum=6.

Cernak, Milos, "Diagnostics for Debugging Speech Recognition Systems", In Proceedings of the 13th international conference on Text, speech and dialogue, Sep. 6, 2010, 8 pages.

"Microsoft Speech Application SDK 1-DreamSpark", Retrieved on: Oct. 13, 2014 Available at: http://csuf-ecs.onthehub.com/WebStore/OfferingDetails.aspx?o=56184e61-f78d-e011-969d-0030487d8897.

Geiser, et al., "An Integrated Algorithm and Software Debugging Tool for Signal Processing Applications", In Proceedings of System, Software, SoC and Silicon Debug Conference, Sep. 2009, 5 pages.

"Microsoft .NET Speech SDK 1.0 Beta 2: New Features and Enhancements", Published on: Oct. 2012 Available at: http://xml.coverpages.org/MS-SDKBeta2.pdf.

Robbins, Thom, "Building Speech-Enabled Applications with ASP.NET", Retrieved on: Oct. 13, 2014 Available at: http://www.codemag.com/Article/0511041.

\* cited by examiner

SPEECH RECOGNITION ERROR DIAGNOSIS

BACKGROUND

An ever-increasing number of software applications employ speech recognition. Speech recognition software components may be found on all manner of devices, including on portable or wearable devices, and can utilize speech recognition to perform a variety of tasks in response to spoken instructions or queries. Speech recognition components typically employ speech recognition processes that analyze inputs representative of a user's speech in order to determine one or more appropriate actions associated with the spoken input. Speech recognition components typically involve a large number of variables and modeling parameters, and each of these various elements may contribute to errors that occur in speech recognition processes.

SUMMARY

In an example implementation, a system for diagnosing speech recognition errors may include an error detection module configured to determine that a speech recognition result is at least partially erroneous, and a recognition error diagnostics module. The recognition error diagnostics module may be configured to (a) perform a first error analysis of the at least partially erroneous speech recognition result to provide a first error analysis result; (b) perform a second error analysis of the at least partially erroneous speech recognition result to provide a second error analysis result; and (c) determine at least one category of recognition error associated with the at least partially erroneous speech recognition result based on a combination of the first error analysis result and the second error analysis result.

In another example implementation, an apparatus for diagnosing speech recognition errors may include at least one processing component, and one or more computer-readable media operably coupled to the at least one processing component. The one or more computer-readable media may bear one or more instructions that, when executed by the at least one processing component, perform operations including at least: performing one or more speech recognition operations to provide a speech recognition result, performing a first error analysis of the speech recognition result to provide a first error analysis result, performing a second error analysis of the speech recognition result to provide a second error analysis result, and determining at least one corrective action to at least partially increase an operability of at least one of the one or more speech recognition operations based on a combination of at least the first error analysis result and the second error analysis result.

In another example implementation, a method for diagnosing a speech recognition error may include (a) performing at least one first error analysis operation on a speech recognition result generated by a speech recognition component to provide at least one first error analysis result, (b) performing at least one second error analysis operation on the speech recognition result to provide at least one second error analysis result, and (c) based on a combination of at least the first error analysis result and the second error analysis result, determining at least one corrective action toat least partially increase an operability of at least one speech recognition operation of the speech recognition component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

DETAILED DESCRIPTION

The present disclosure describes techniques and technologies for diagnosing and correcting speech recognition errors. Due to the variability and complexity of the incoming inputs, and the modeling parameters and other aspects involved in the speech recognition process, when speech recognition errors occur, it may be difficult for developers (particularly non-expert developers) to interpret the recognition errors and determine an appropriate corrective action that improves the speech recognition results. Techniques and technologies for diagnosing and correcting speech recognition error in accordance with the present disclosure may advantageously assist such developers with evaluating the results of their speech recognition components, diagnosing errors, and providing insights into possible corrective actions to improve such speech recognition components.

In at least some implementations, techniques and technologies for evaluating and diagnosing speech recognition processes in accordance with the present disclosure may provide substantial operational improvements in speech recognition components, including, for example, providing improved recognition results, improved operating performance (e.g., less memory usage, less computational requirements, etc.), or reduced resource usage (e.g., less memory usage, less power consumption, etc.) in comparison with conventional techniques and technologies.

In the following disclosure, an embodiment of a system for diagnosis and correction of speech recognition errors is described. Embodiments of processes for speech recognition error diagnosis and correction are then described. Finally, embodiments of environments in which the automatic speech recognition diagnostic and recommendation techniques and technologies may be implemented are described.

Embodiments of Systems for Speech Recognition Error Diagnosis and Correction

Figure 1:
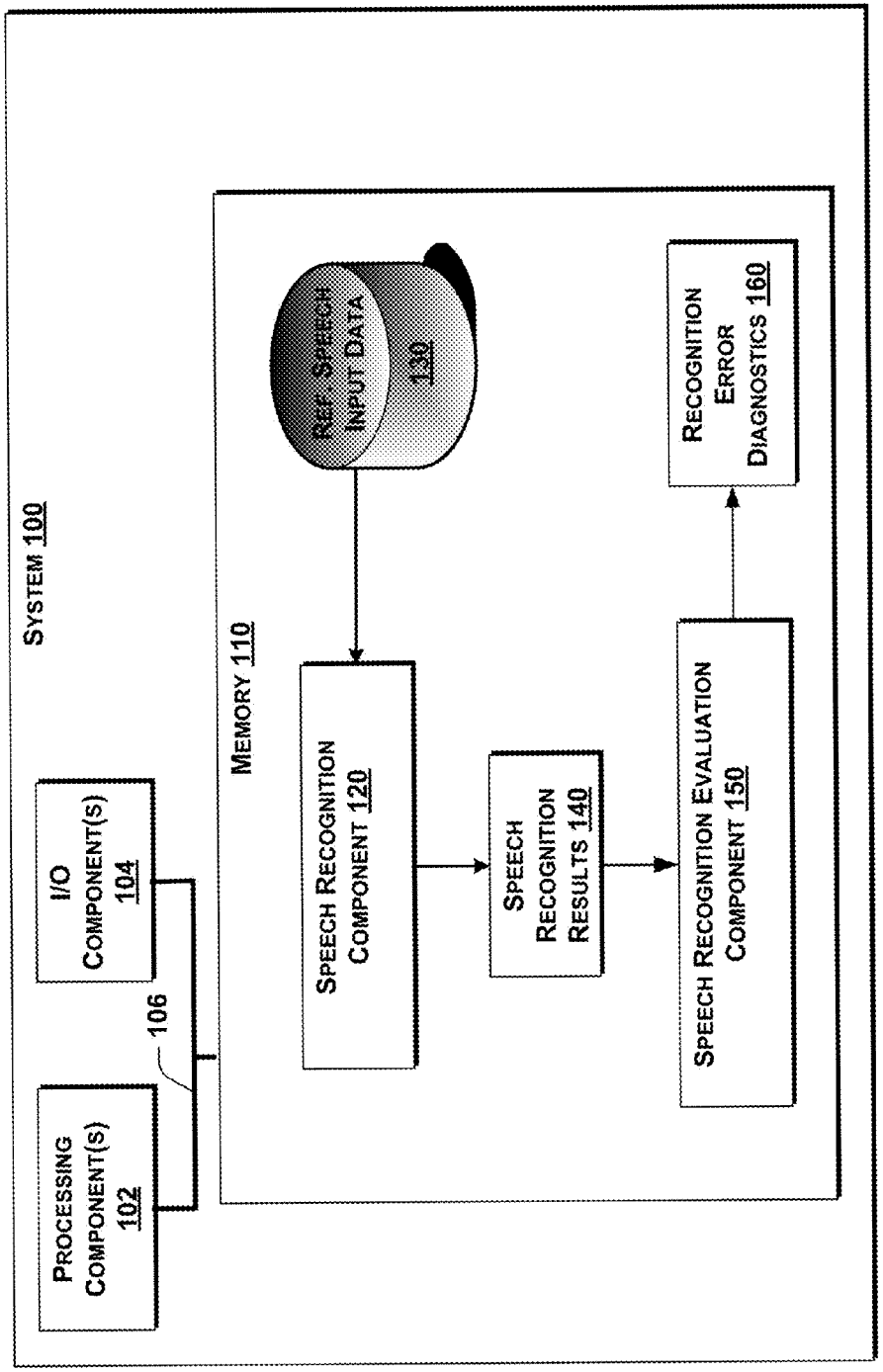
FIG. 1 shows an embodiment of a system for performing speech recognition error diagnosis.

An embodiment of a system 100 for performing speech recognition error diagnosis is shown in FIG. 1. In this implementation, the system 100 includes one or more processing components 102, and one or more input/output (I/O) components 104 coupled to a memory 110 by a bus 106. In the implementation shown in FIG. 1, the system 100 further includes a speech recognition component 120. The speech recognition component 120 may be any suitable component that performs speech recognition, such as a component intended for use on a handheld communication device (e.g., a cell phone), or on a gaming console, or on any other suitable device. In at least some implementations, the speech recognition component 120 may be a speech recognition component that a developer (not shown) has created by making various selections (e.g., variables, model types, modeling parameters, etc.), and that the developer wishes to evaluate and validate.

In the implementation shown in FIG. 1, the system 100 also includes reference speech input data 130 that may be input to the speech recognition component 120. In at least some implementations, the reference speech input data 130 may be representative of speech utterances that the speech recognition component 120 may encounter during typical operations. The speech recognition component 120 receives the reference speech input data 130, performs speech recognition on the reference speech input data 130, and outputs speech recognition results 140. The quality and accuracy of the speech recognition results 140 may vary depending upon various aspects of the speech recognition component 120 (e.g., variables, model types, modeling parameters, etc.).

As further shown in FIG. 1, the system 100 also includes a speech recognition evaluation component 150. The speech recognition evaluation component 150 receives and analyzes the speech recognition results 140, and provides recognition error diagnostics 160. More specifically, in at least some implementations, the speech recognition evaluation component 150 may evaluate and diagnose errors that occur, may categorize errors by probable error cause (or source), and may provide one or more recommendations for possible corrective action to improve the performance of the speech recognition component 120. Such performance improvements may include, for example, providing improved speech recognition results, reducing speech recognition errors (or error rates), providing improved operating efficiencies (e.g., less memory requirement, fewer operations requiring fewer computational cycles or other requirements), and reducing resource usage of the system 100 (e.g., less memory usage, less power consumption, less computational operations and hardware usage) in comparison with conventional techniques and technologies.

Figure 2:
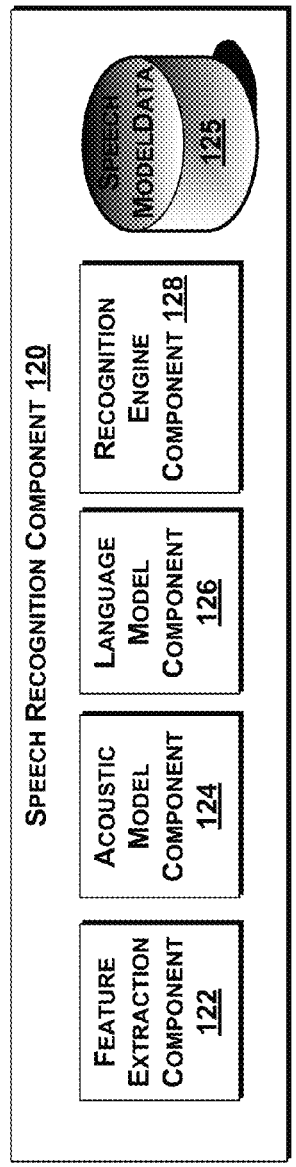
FIG. 2 illustrates an embodiment of a speech recognition component.

FIG. 2 illustrates an embodiment of a speech recognition component 120. In the implementation shown in FIG. 2, the speech recognition component 120 includes a feature extraction component 122 that receives input signals representative of speech (e.g., the reference speech input data 130), and processes the input signals by determining and isolating segments that are speech and converting such segments into numeric values (or vectors). Feature extraction techniques for speech recognition applications are generally known, and a variety of suitable feature extraction techniques may be employed by the feature extraction component 120, including, for example, one or more of the techniques discussed or mentioned in "Review of Feature Extraction Techniques in Automatic Speech Recognition," by Shanthi, Therese S. and Chelpa, Lingam, Int'l Journal of Scientific Engineering and Technology, Vol. No. 2, Issue No. 6, pp. 479-484, (ISSN:2277-1581) (Jun. 1, 2013), and "Advanced Feature Extraction & Its Implementation In Speech Recognition System," Jain, R. and Saxena, S. K., IJSTM, Vol. No. 2, Issue No. 3 (July 2011).

As further shown in FIG. 2, the embodiment of a speech recognition component 120 further includes an acoustic model component 124. In at least some implementations, the acoustic model component 124 receives the output from the feature extraction component 122 and establishes statistical representations representative of speech segments. The acoustic model component 124 may, in at least some implementations, rely on speech model data 125 to prepare or "train" the acoustic model(s) used by the acoustic model component 124. A variety of different acoustic models may be employed by the acoustic model component 124, including, for example, Hidden Markov Models (HMM), segmental models, super-segmental models (e.g., hidden dynamic models), neural networks, deep neural-network (DNN) models, maximum entropy models, conditional random fields (e.g., hidden conditional random fields), or any other suitable acoustic models.

The embodiment of a speech recognition component 120 further includes a language model component 126. In at least some implementations, the language model component 126 may receive the output from the acoustic model component 124, and may statistically assign one or more probabilities to each output from the acoustic model component 124 that the output is a particular word or sequence of words. In other implementations, the language model component 126 may be a non-statistical language model, such as a rule-based grammar model (e.g., context-free grammar models, phrase structure grammar models, etc.), or any other suitable type of model. The language model component 126 may, in at least some implementations, rely on speech model data 125 to prepare or "train" the language model(s) used by the language model component 126.

As further shown in FIG. 1, the speech recognition component 120 may include a recognition engine (or decoding) component 128 that receives the outputs from one or more of the feature extraction component 122, the acoustic model component 124, and the language model component 126, and outputs the speech recognition results 140 (FIG. 1). For example, for a particular instance of the reference speech input data 130, the speech recognition results 140 output by the recognition engine component 128 may be one or more words (e.g., "Hello World") along with a probability score associated with each of the one or more words (e.g., "Hello World" with a probability score of "0.9" (or 90%) associated with "Hello" and "0.8" (or 80%) associated with "World").

Figure 3:
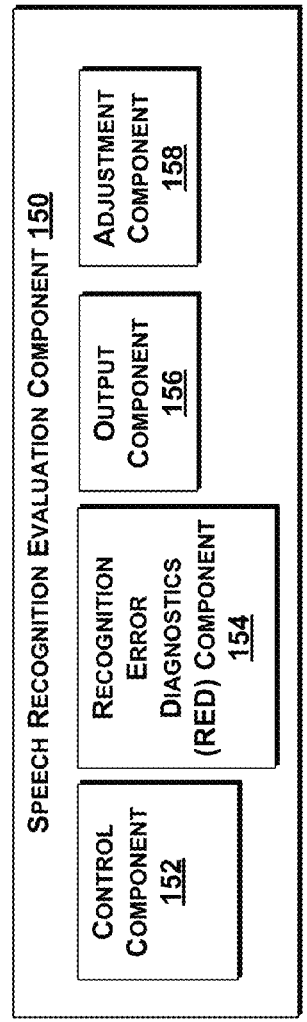
FIG. 3 shows an embodiment of a speech recognition evaluation component.

FIG. 3 illustrates an embodiment of a speech recognition evaluation component 150. In this implementation, the speech recognition evaluation component 150 includes a control component 152, a recognition error diagnostics (or diagnosis) (RED) component 152, an output component 154, and an adjustment component 158. In at least some implementations, the control component 152 may receive one or more inputs for controlling the speech recognition evaluation component 150. For example, a user may select which files to use as the reference speech input data 130 for evaluating the speech recognition component 120, or various options for outputting the recognition error diagnostics 160 (e.g., graphical, tabular, etc.).

In at least some implementations, the recognition error diagnostics (or diagnosis) component 154 receives and analyzes the speech recognition results 140 (FIG. 1) from the speech recognition component 120 and generates the recognition error diagnostics 160 (FIG. 1). More specifically, in at least some implementations, the recognition error diagnostics component 154 may evaluate and diagnose speech recognition errors that occur, categorize one or more errors by probable error cause (or source), and may also provide one or more recommendations for possible corrective action to improve the performance of the speech recognition component 120, as described more fully below.

The output component 156 outputs the recognition error diagnostics 160 generated by the recognition error diagnostics component 154. The output component 156 may provide the output according to one or more selections by a user via the control component 152, or by predetermined defaults, or by any suitable combination thereof. In some implementations, the output component 156 may store the recognition error diagnostics 160 on memory 110, or may output the recognition error diagnostics 160 via one or more output devices (e.g., display device, printer, etc.) for analysis and evaluation by the user, or may output the recognition error diagnostics 160 in any other suitable manner.

In at least some implementations, the output component 156 may provide the recognition error diagnostics 160 to the adjustment component 158, which may in turn make appropriate adjustments to one or more aspects of the speech recognition component 120 intended to improve the performance of the speech recognition component 120. As described more fully below, in at least some implementations, the speech recognition component 120 and the speech recognition evaluation component 150 may operate iteratively until one or more recognition errors that may be occurring in the speech recognition results 140 have been resolved or have otherwise reached an acceptable level of resolution.

Embodiments of Processes for Evaluating Speech Recognition Components

Figure 4:
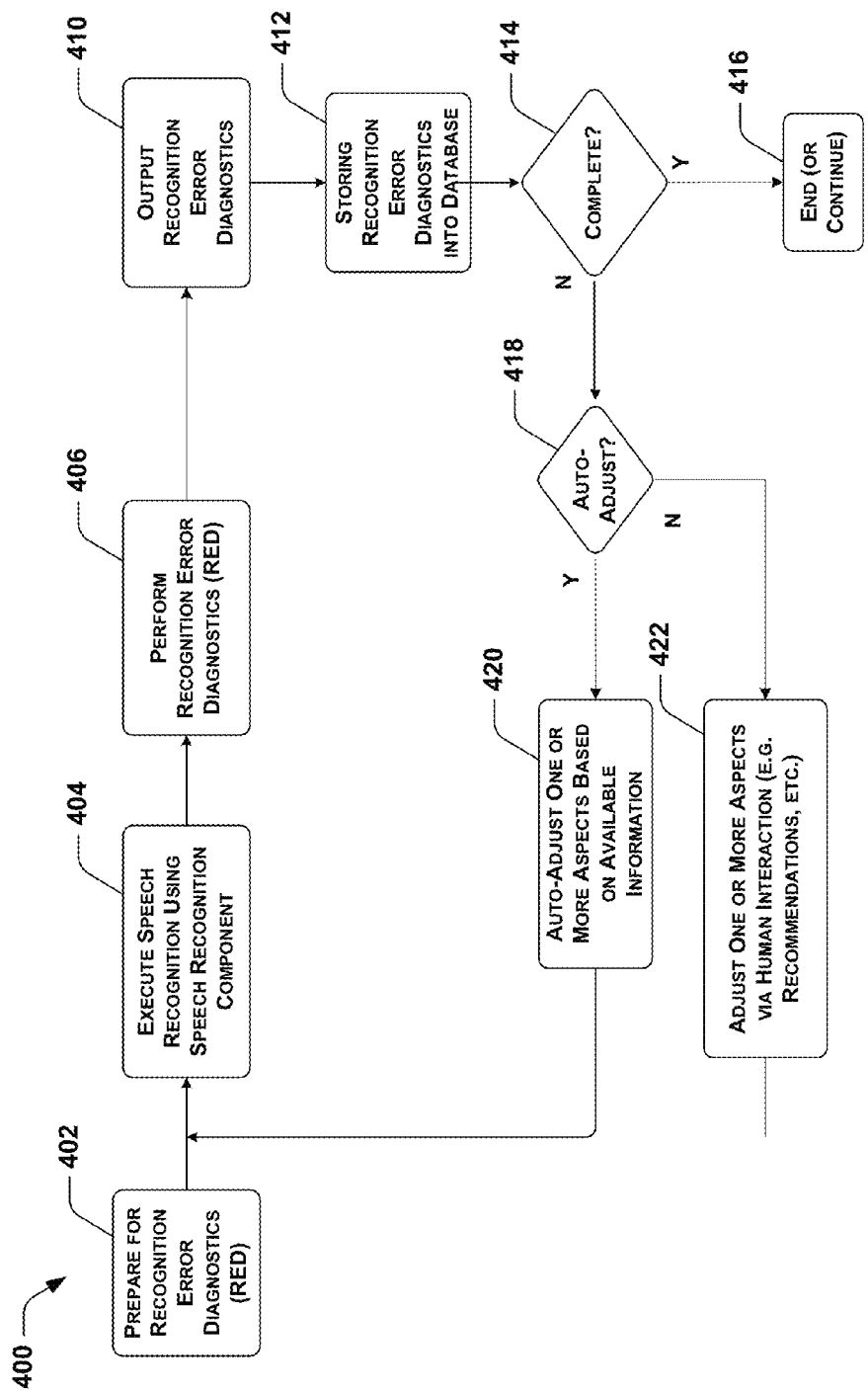
FIG. 4 shows an embodiment of an evaluation process for evaluating a speech recognition component.

An embodiment of an evaluation process 400 for evaluating a speech recognition component is shown in FIG. 4. The evaluation process 400 shown in FIG. 4 represents a high-level overview suitable for introducing one or more concepts involved in evaluating a speech recognition component. Additional details regarding specific aspects and implementations of various recognition error diagnostic operations are described more fully below.

In the implementation shown in FIG. 4, the example evaluation process 400 includes preparing for recognition error diagnostics (RED) at 402. Preparing for recognition error diagnostics at 402 may include a user making one or more selections involved in a particular "build" of a speech recognition component (e.g., acoustic model, language model, lexicon, training data, etc.). In at least some implementations, one or more control settings may be adjusted or "set" in order to constrain or limit the impact of one or more factors of the evaluation process in order to evaluate a limited number of factors (e.g., one factor at a time), which may allow changes (if any) associated with variations of one or more particular factors to be more readily assessed or evaluated.

Following the preparation for recognition error diagnostics (RED) at 402, the example evaluation process 400 includes executing speech recognition using a speech recognition component at 404. In at least some implementations, the executing speech recognition at 404 includes providing reference speech input data (e.g., reference speech input data 130 of FIG. 1) to a speech recognition component (e.g., speech recognition component 120 of FIGS. 1 and 2) that is being developed and evaluated by a user to generate speech recognition results (e.g., speech recognition results 140 of FIG. 1). The reference speech input data may, for example, be a set of audio inputs representing speech utterances, and a set of transcribed results that represent the known or correct speech recognition results associated with the audio inputs.

As further shown in FIG. 4, the example evaluation process 400 performs recognition error diagnostics (RED) on the speech recognition results from the speech recognition component at 406. In at least some implementations, the performing recognition error diagnostics (at 406) may include comparing the speech recognition results with corresponding known (or correct) speech utterances to determine which reference speech input data were properly recognized and which were erroneously recognized. In at least some implementations, for those "failing cases" for which speech recognition errors have occurred, the performing recognition error diagnostics (at 406) may include performing additional analysis operations on such cases to interpret errors, categorize errors, identify possible causes of errors, and identify recommendations for possible ways to correct the errors. In addition, the performing recognition error diagnostics (at 406) may include statistically analyzing the speech recognition results to provide statistical feedback to the user on the types of recognition errors (or error categories) that were present in the speech recognition results. Various aspects and embodiments of operations that may be included in performing recognition error diagnostics (at 406) are described more fully below with respect to FIGS. 5 and 7 through 11.

In the implementation shown in FIG. 4, the example evaluation process 400 includes outputting recognition error diagnostics at 410. For example, in at least some implementations, the output of recognition error diagnostics (at 410) may include displaying a statistical breakdown of the various speech recognition errors that occurred by probable error type (or category), outputting one or more specific details involved in one or more specific "failing cases," outputting one or more possible interpretations for why one or more errors occurred, offering one or more suggestions or recommendations for possible ways to reduce errors, or providing other relevant information which may assist the user in possible ways to adjust one or more aspects of the speech recognition component to improve speech recognition accuracy (e.g. reduce errors or error rates), or to improve the speech recognition component in other possible ways (e.g., improve computational efficiency, reduce number of operations required, decrease memory usage, decrease power consumption, etc.). As noted above, in at least some implementations, the recognition error diagnostics may be displayed on a display device, stored in memory, or output in any other suitable manner.

Following output of the recognition error diagnostics (at 410), the example evaluation process 400 may also store the recognition error diagnostics (determined at 406) into a database at 412. The storing of recognition error diagnostics at 412 for a particular speech recognition component (or "build") may be useful, for example, so that the example evaluation process 400 may access and provide such results to a user who is attempting to evaluate an identical "build" using the same reference speech input data, thereby saving computational resources by eliminating unnecessary processor usage.

As further shown in FIG. 4, the example evaluation process 400 determines whether the evaluation of the speech recognition component is complete at 414. For example, if speech recognition errors are within acceptable limits, the evaluation process 400 may be determined to be complete and the evaluation process 400 may end (or continue to other processes) at 416. In at least some implementations, a relatively high percentage of "correct cases" (e.g., 95% correct cases) may be used as an indication of completeness. Alternately, correction of one or more targeted recognition scenarios can be an indication of completeness. For example, if a speech recognition component is providing an improper recognition as "sea hawk" instead of a desired recognition "seahawk," then if one or more adjustments to the speech recognition component provides the desired recognition results and no more improper recognitions, then the evaluation process 400 may be considered complete (at 414). Of course, any other suitable criteria for determining that the evaluation process 400 is complete may be used (e.g., usage of a specified amount of computational resources, etc.).

If the evaluation process 400 is not complete at 414, the evaluation process 400 may determine whether one or more aspects of the speech recognition evaluation process may be automatically adjusted based on the recognition error diagnostics at 418 (e.g., by adjustment component 158 of FIG. 3). For example, in at least some implementations, the recognition error diagnostics may include one or more recommendations for possible ways to improve performance of a speech recognition component that are amenable to adjustment without human intervention (e.g., a recommendation to adjust one or more engine settings, recommendation to repeat evaluation using different reference speech input data, etc.). In at least some implementations, the evaluation process 400 may perform such adjustments of various aspects of the speech recognition component without requiring intervention by the user.

If an automated adjustment of the speech recognition evaluation process is determined to be possible (at 418), then the evaluation process 400 may perform one or more adjustments of one or more aspects of the speech recognition evaluation process at 420 (e.g., by adjustment component 158 of FIG. 3). On the other hand, if an automated adjustment is not determined to be possible at 418, then adjustment of one or more aspects of the speech recognition evaluation process may be performed by human interaction at 422 (e.g., user selecting a different acoustic or language model component, user supplementing or modifying training data for acoustic or language model components, etc.).

After one or more adjustments to the speech recognition evaluation process are performed (either automatically at 420 or by human interaction at 422), the evaluation process 400 may return to the execution of speech recognition using the speech recognition component at 404, and the above-described operations of the evaluation process 400 may be iteratively repeated until the evaluation process 400 is determined to be complete at 414. In this way, in at least some implementations, one or more speech recognition components (or "builds") may be iteratively evaluated, and the operational performance of the speech recognition component may be improved. Such performance improvements may include, for example, providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

Figure 5:
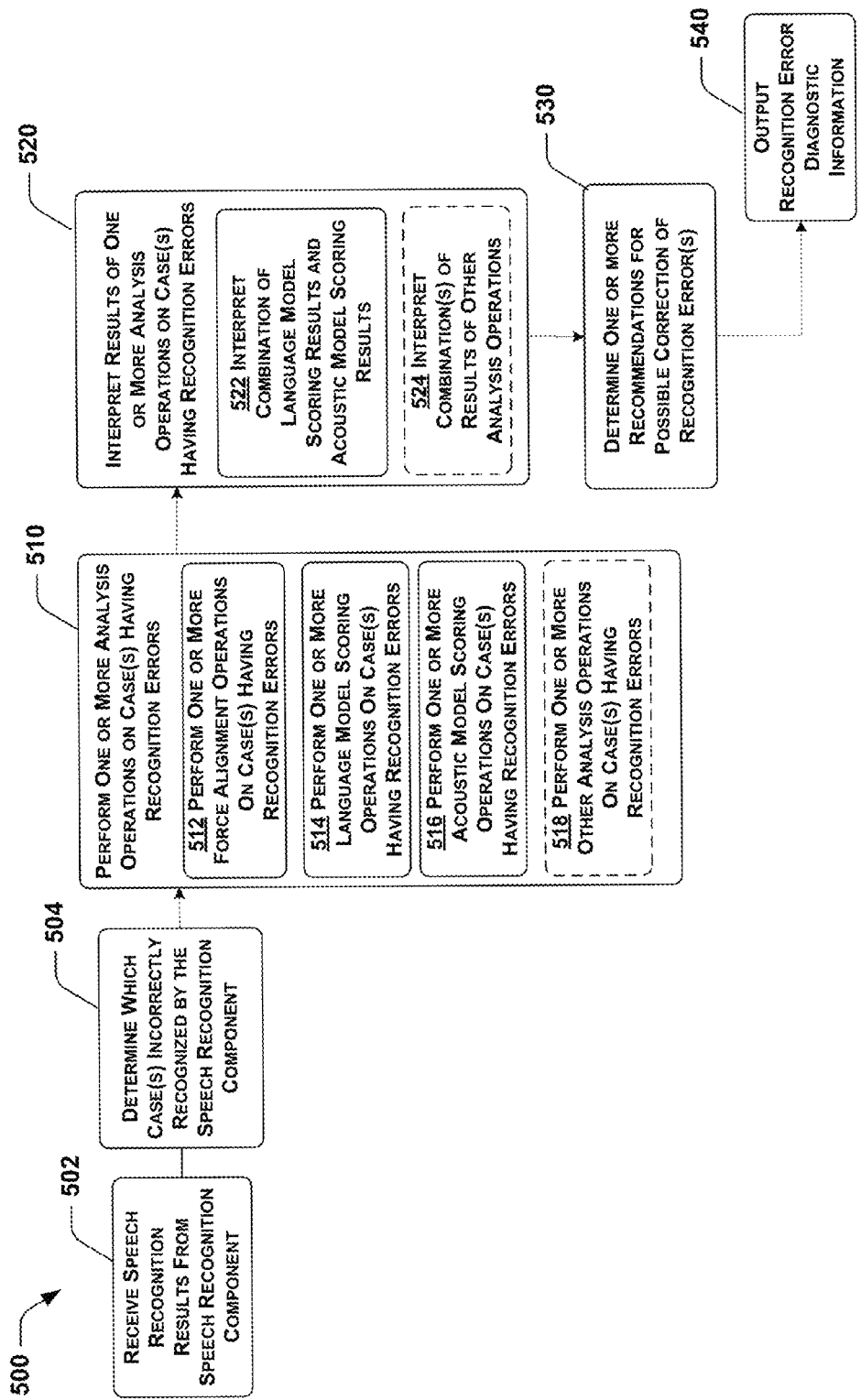
FIG. 5 illustrates an embodiment of a diagnostic process for performing recognition error diagnostics on speech recognition results.

The performance of recognition error diagnostics on the speech recognition results (e.g., at 406 of FIG. 4) may be accomplished in a variety of suitable implementations. For example, FIG. 5 shows an embodiment of a diagnostic process 500 for performing recognition error diagnostics on speech recognition results. In this implementation, the example diagnostic process 500 includes receiving speech recognition results from a speech recognition component at 502. As noted above, in at least some implementations, the speech recognition results may have been generated by a user providing a set of reference speech inputs to a speech recognition component that a user (e.g., a developer) has created and wishes to evaluate. In at least some implementations, the reference speech inputs may be a set of audio inputs representing speech utterances, and a set of transcribed results that represent the known or correct speech recognition results associated with the audio inputs.

As further shown in FIG. 5, the diagnostic process 500 includes determining which cases were incorrectly recognized by the speech recognition component at 504. For example, in at least some implementations, the diagnostic process 500 may compare the received speech recognition results with reference speech results to determine which cases were incorrectly recognized.

The diagnostic process 500 includes performing one or more analysis operations on cases having recognition errors at 510. More specifically, in at least some implementations, the one or more analysis operations that are performed on cases having recognition errors (at 510) may include performing one or more force alignment operations on cases having recognition errors at 512. In at least some implementations, the one or more force alignment operations at 512 may include taking an audio segment (i.e. the reference result) and determining where in time one or more particular words occur in the audio segment, comparing those results with the speech recognition results from the speech recognition component, and determining whether each case from the speech recognition component is acceptable (e.g., "pass") or not acceptable (e.g., "fail") from an alignment perspective. Additional aspects of possible force alignment operations that may be performed at 512 are described more fully below.

As further shown in FIG. 5, in at least some implementations, the one or more analysis operations that are performed on cases having recognition errors (at 510) may include performing one or more language model scoring operations on cases having recognition errors at 514. As describe above, a language model typically determines a probability (or score) that an associated segment of speech is a particular word or sequence of words. Additional aspects of possible language model scoring operations that may be performed at 514 are described more fully below.

In at least some implementations, the one or more analysis operations that are performed on cases having recognition errors (at 510) may include performing one or more acoustic model scoring operations on cases having recognition errors at 516. Similar to the language model, an acoustic model may determines a probability (or score) that an associated segment of speech is a particular word or sequence of words. Additional aspects of possible acoustic model scoring operations that may be performed at 516 are described more fully below.

Furthermore, in at least some implementations, the one or more analysis operations that are performed on cases having recognition errors (at 510) may include performing one or more other analysis operations on cases having recognition errors at 518. Such other analysis operations may include, for example, one or more engine setting check operations, one or more emulation operations, one or more dictionary (or spell) check operations, or other suitable analysis operations. Again, additional aspects of possible other analysis operations that may be performed at 518 are described more fully below.

The example diagnostic process 500 shown in FIG. 5 further includes interpreting the results of the one or more analysis operations performed on cases having recognition errors at 520. For example, in at least some implementations, the interpreting of the results of the one or more analysis operations (at 520) may include interpreting a combination of language model scoring results and acoustic model scoring results at 522. In further implementations, the interpreting of the results of the one or more analysis operations (at 520) may include interpreting one or more combinations of other analysis results at 524 (e.g., force alignment results, language model scoring results, acoustic model scoring results, engine setting check results, emulation results, dictionary (or spell) check results, etc.). Additional aspects of possible interpretation operations that may be performed at 520 are described more fully below.

With continued reference to FIG. 5, following the interpretation of results of one or more analysis operations (at 520), the diagnostic process 500 includes determining one or more recommendations for possible correction of one or more recognition errors at 530. As described more fully below, based on the analyses (at 510) and the interpretations (at 520), the diagnostic process 500 may provide a variety of different recommendations for possible correction of recognition errors (determined at 530), including, for example, suggesting adjustments of engine settings, suggesting adjustments of language model parameters, suggesting adjustments of acoustic model parameters, suggesting supplementation of training data, or other suitable recommendations for possible correction of errors. Additional aspects of determining one or more recommendations that may be performed at 530 are described more fully below.

The example diagnostic process 500 then outputs recognition error diagnostic information at 540. For example, in at least some implementations, the output of recognition error diagnostic information may include statistical information on the various speech recognition errors that occurred by probable error type (or category), information on one or more specific "failing cases," suggestions or recommendations for possible ways to correct errors, or other relevant information that may be useful to a user (e.g., a developer) of the speech recognition component.

Figure 6:
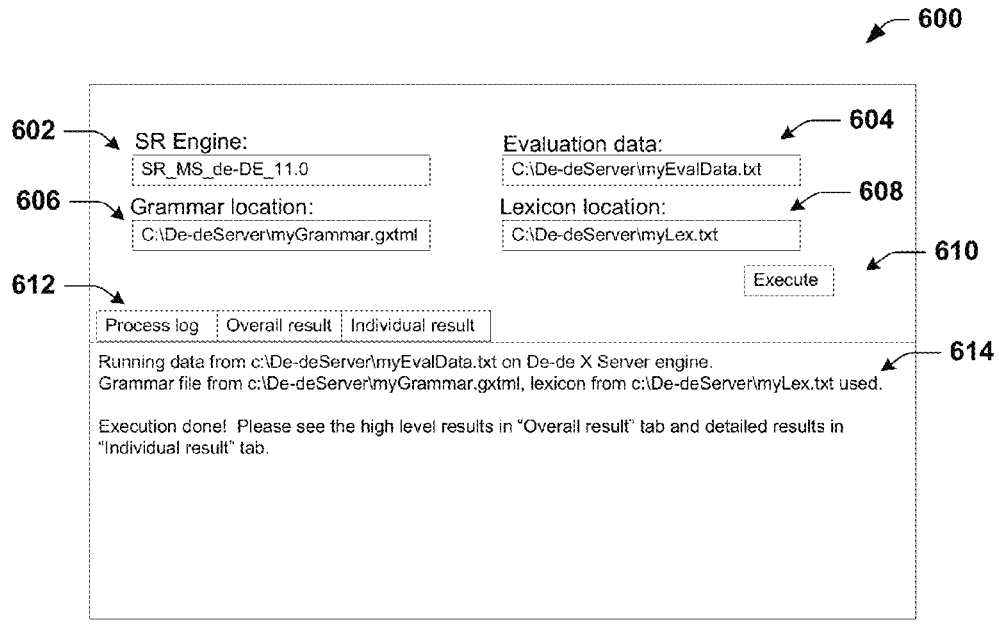
FIGS. 6 through 8 illustrate embodiments of user interfaces for providing information to, and receiving information from, a speech recognition evaluation process.

As noted above with respect to FIG. 4, in some implementations, an evaluation process may include one or more operations associated with preparing to perform recognition error diagnostics (e.g., at 402 of the example evaluation process 400). Such preparations for recognition error diagnostics may be accomplished in a variety of suitable ways. For example, FIG. 6 illustrates an embodiment of a user interface 600 for providing one or more inputs to an evaluation process (e.g., evaluation process 400). In this implementation, a user (e.g., speech recognition component developer) may select or indicate a particular speech recognition component (or "build") which the user wishes to evaluate at 602. The user may further indicate a particular set of "evaluation data" (e.g., reference speech input data 130 of FIG. 1) the user wishes to use to test the speech recognition component at 604. In addition, the example user interface 600 enables the user to select an initial grammar file to use to evaluate the speech recognition component at 606, and further enables the user to select an initial lexicon file to use to evaluate the speech recognition component at 608. By engaging an execute button at 610, the user may indicate that the preparation for recognition error diagnostics is complete. In at least some implementations, the user interface 600 provides a process tab at 612, which the user may select to view a status window at 614 that provides information to the developer about the ongoing progress of the evaluation process. Of course, the user interface 600 is merely one non-limiting example of a possible user interface for enabling a user to initiate and monitor an evaluation process.

Figure 7:
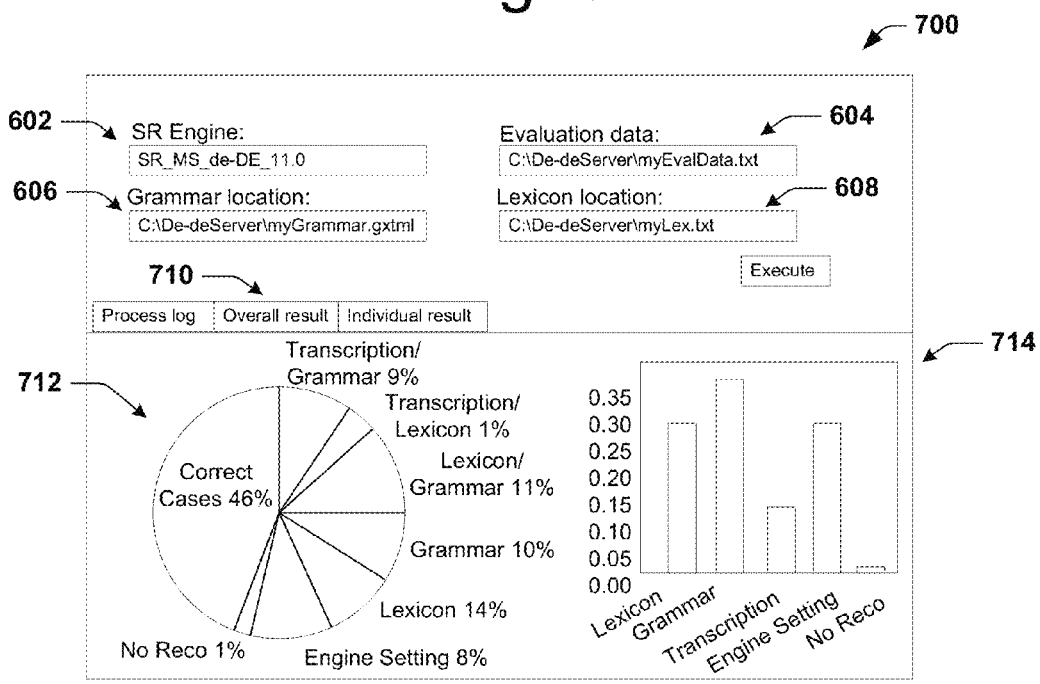

Also, as noted above with respect to FIG. 4, in some implementations, an evaluation process may output recognition error diagnostics (e.g., at 410 of the example evaluation process 400). Such outputting of recognition error diagnostics may be accomplished in a variety of suitable ways. For example, as shown in FIG. 7, in at least some implementations, an evaluation process (e.g., the example evaluation process 400) may output recognition error diagnostics using an embodiment of a user interface 700. In the implementation shown in FIG. 7, the user may engage an "overall result" tab 710 of the example user interface 700 to view, for example, a pie chart 712 and a bar chart 714 showing a statistical breakdown of the recognition error diagnostics. In some implementations, the recognition error diagnostics may provide a percentage of cases that were correctly recognized, and various percentages of cases experiencing recognition errors (e.g., "failing cases") in various error categories (e.g., "transcription/grammar" errors, "transcription/lexicon" errors, "lexicon/grammar" errors, "grammar" errors, "lexicon" errors, "engine setting" errors, "no reco" errors, etc.). It will be appreciated that the user interface 700 is merely one possible example of how recognition error diagnostic results may be provided to a user. The output of the recognition error diagnostics may provide useful information to the user or developer of a speech recognition component as to possible ways to improve the operability of the speech recognition component.

Figure 8:
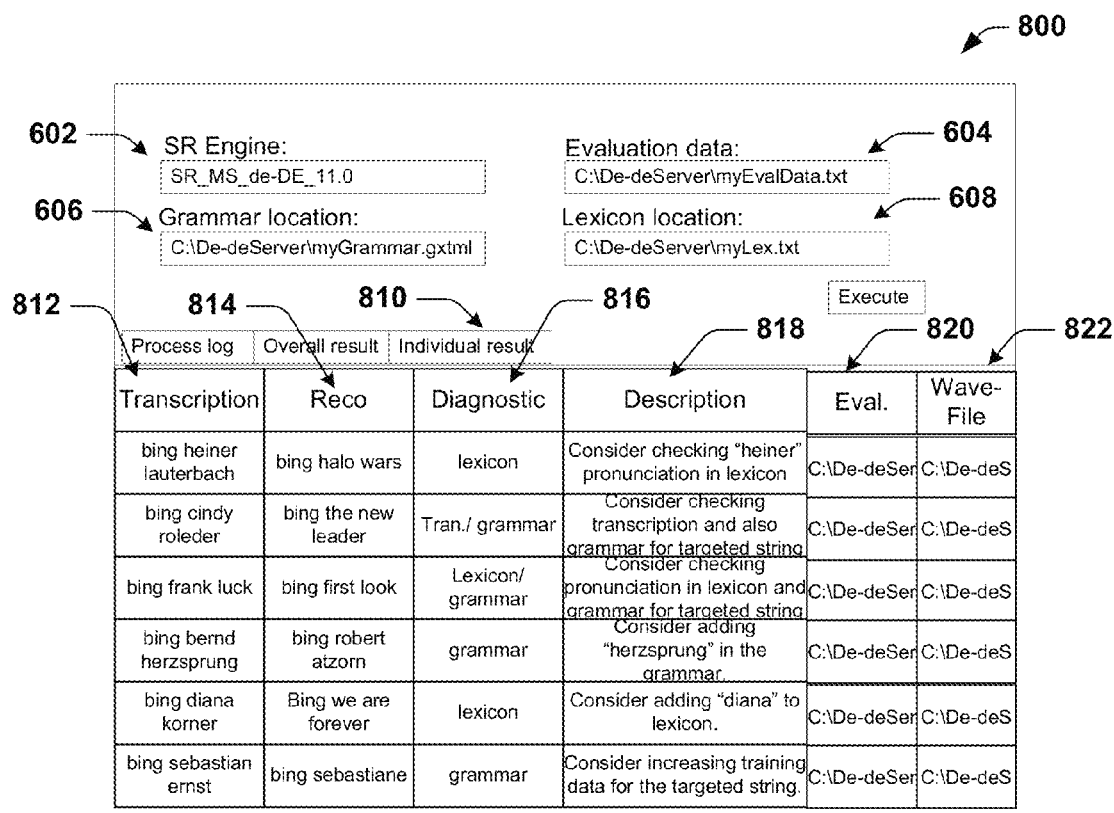

In at least some implementations, the recognition error diagnostics provided by an evaluation process may include individual (or "case specific") results. For example, as shown in FIG. 8, in at least some implementations, an evaluation process (e.g., the example evaluation process 400) may output various individual (or "case specific") results using an embodiment of a user interface 800. More specifically, following the performance of the recognition error diagnostics, the user may engage an "individual result" tab 810 which may provide detailed information for one or more specific cases of the speech recognition results. As shown in FIG. 8, in at least some implementations, such individual results may include a transcription of the reference speech input data 812, the erroneous speech recognition result (or how the speech recognition component perceived the reference audio input data) 814, diagnostic information 816 as to one or more possible causes of the speech recognition error, one or more recommendations 818 for possible resolution of the error, and identification of one or more of the particular inputs 820, 822 used to evaluate the speech recognition component. Again, it will be appreciated that the user interface 800 is merely one possible example of how recognition error diagnostic results may be provided to a user.

Figure 9A:
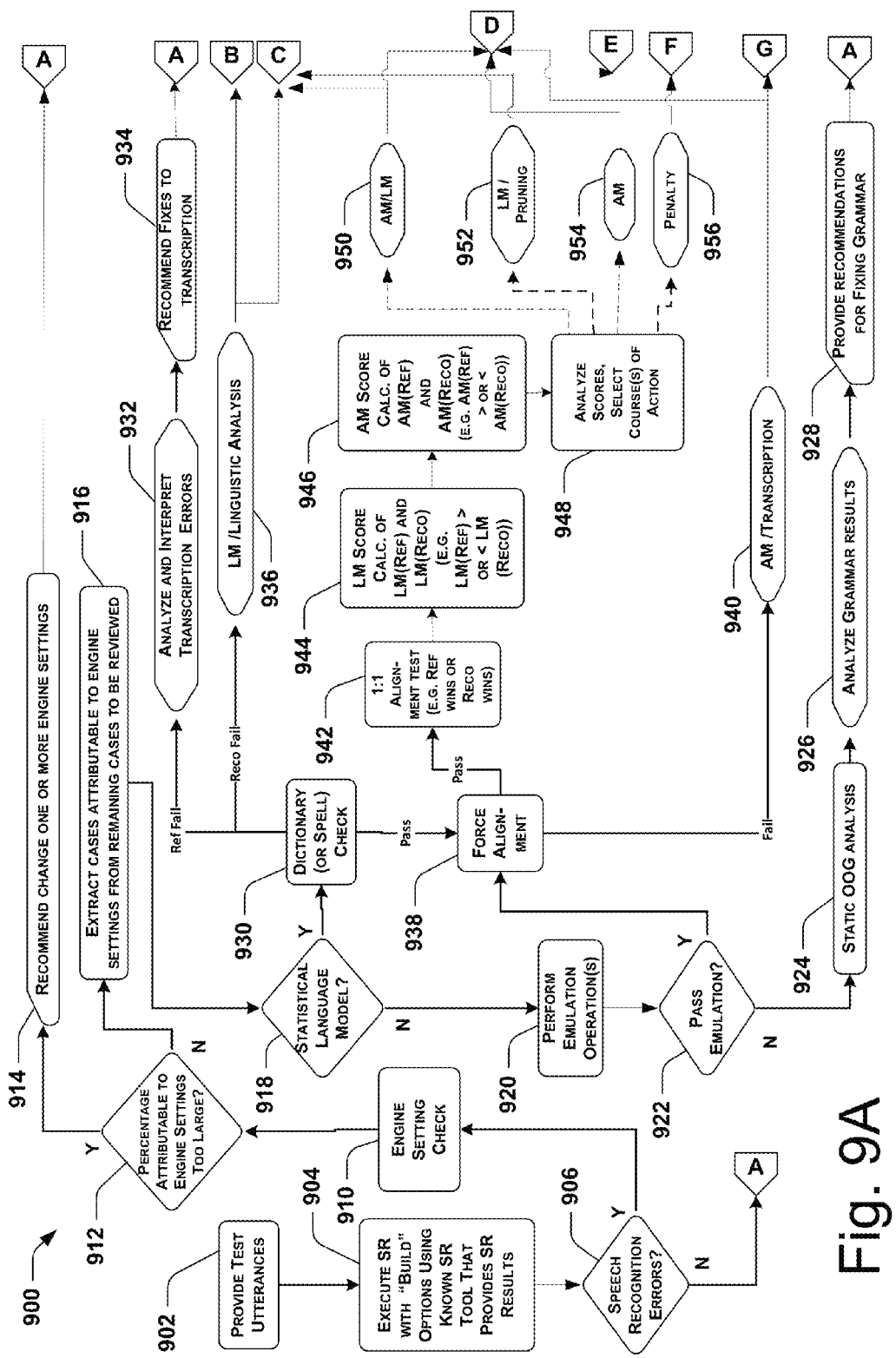
FIGS. 9A and 9B show an embodiment of an evaluation process for evaluating a speech recognition component.
Figure 9B:
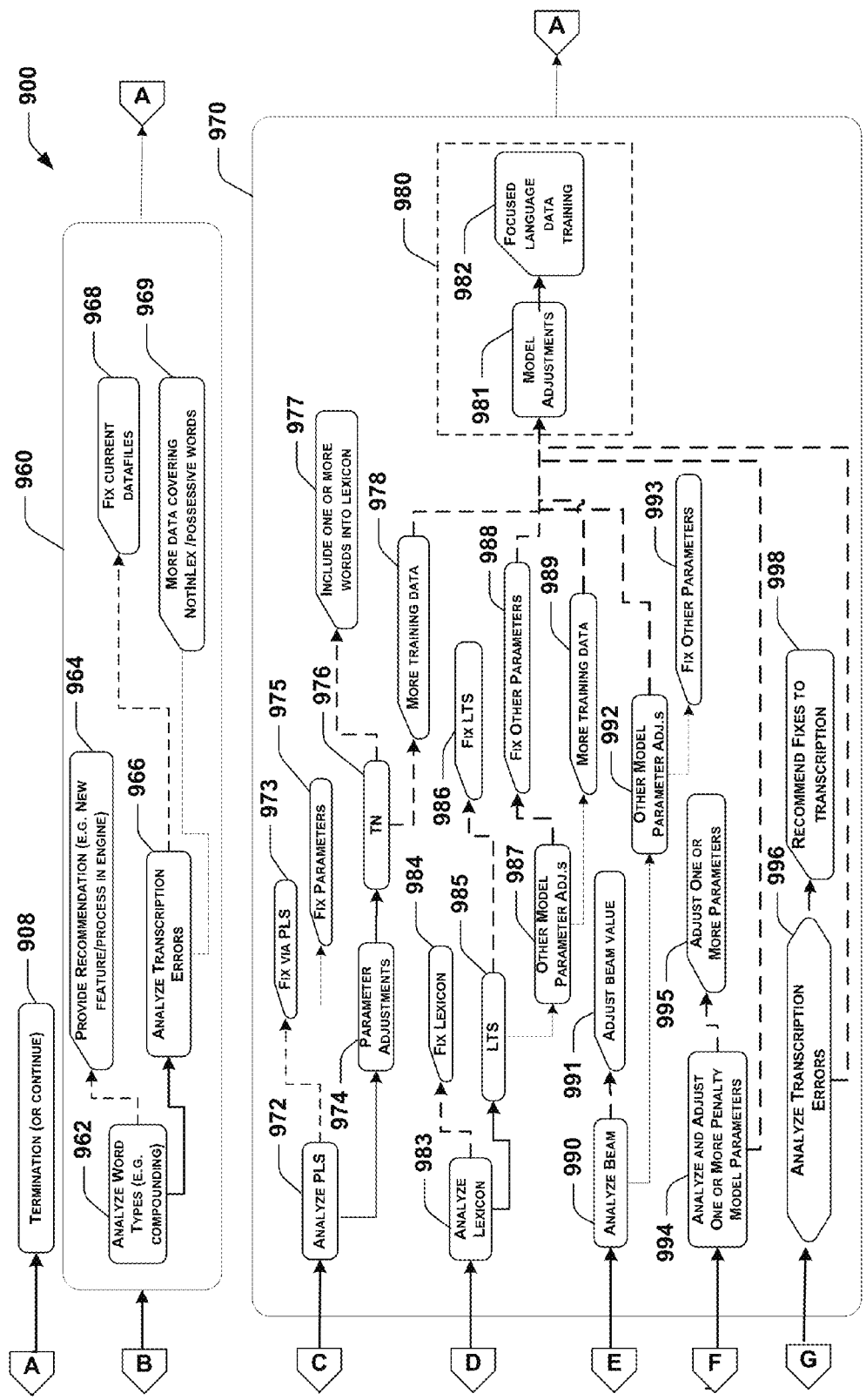

Another embodiment of an evaluation process 900 for evaluating a speech recognition component is shown in FIGS. 9A and 9B. In this implementation, the example evaluation process 900 illustrates additional possible aspects and operations associated with performing recognition error diagnostics on a speech recognition component.

In the implementation shown in FIG. 9A, the example evaluation process 900 includes providing a set of test utterances (e.g., reference speech input data 130) at 902. In at least some implementations, the set of test utterances (e.g., 1000 utterances, 10,000 utterances, etc.) may include associated reference transcriptions (or reference results) which are assumed to be the correct (or reference) speech recognition results (at least during one or more portions of the evaluation process 900).

Speech recognition is executed on the set of test utterances using a speech recognition component that provides speech recognition results at 904. In at least some implementations, the speech recognition results include one or more transcribed words and associated confidence scores. For example, in at least some implementations, a developer's selected "build" options may be implemented in a pre-existing speech recognition (SR) component that provides speech recognition results. A variety of suitable speech recognition components may be used for the execution of the developer's selected "build" options at 904, including for example, one or more speech recognition software tools internally available at Microsoft Corporation of Redmond, Wash., or other speech recognition software components, including but not limited to speech recognition tools developed by Nuance Communications, Inc. of Burlington, Mass., Google Inc. of Mountain View, Calif., Apple Inc. of Cupertino, Calif., or any other suitable speech recognition tools.

With continued reference to FIG. 9A, the evaluation process 900 determines which cases experienced recognition errors during the execution of the test utterances at 906. In at least some implementations, the error determination operations at 906 include comparison of the speech recognition result provided by the speech recognition component (or "build") with the reference results associated with each of the test utterances. For those cases having no speech recognition errors, the evaluation process 900 may indicate that the case has passed, and the evaluation process 900 may proceed (via tab A) to a termination (or may continue to other operations) at 908 (see FIG. 9B).

On the other hand, for cases having speech recognition errors, the example evaluation process 900 proceeds to analyze those "failed cases" to attempt to diagnose one or more probable causes of such failures. More specifically, as further shown in FIG. 9A, the evaluation process 900 proceeds to a check of one or more penalty model and engine settings of the speech recognition component at 910. In at least some implementations, the check of one or more penalty model and engine settings (at 910) represents a first-order, high level examination of one or more basic engine selections or parameters to evaluate whether one or more of the more fundamental assumptions involved in the speech recognition process are appropriately set (e.g., language selection of acoustic and language model components are consistent with test utterances, geographic region selection of acoustic and language model components are consistent with test utterances, etc.). In at least some implementations the check of one or more engine settings (at 910) may include comparison of the one or more penalty model and engine settings with one or more reference values, reference ranges, or other suitable reference information to determine whether such settings are reasonable or within acceptable values.

As further shown in FIG. 9A, the example evaluation process 900 determines whether a percentage of recognition errors (or "failing cases") for which speech recognition errors occurred due to one or more engine settings is above an acceptable threshold at 912 (e.g., above a predefined percentage, etc.). If the percentage of recognition errors due to one or more engine settings is unacceptable, then the evaluation process 900 provides a recommendation to modify (or correct) one or more engine settings at 914, and proceeds (via tab A) to a termination of the evaluation process 900 at 908 (see FIG. 9B). Alternately, if the percentage of recognition errors due to one or more engine settings is not unacceptably high, then the evaluation process 900 extracts those "failing cases" attributable to one or more engine settings from the remaining cases to be reviewed at 916.

The example evaluation process 900 determines whether a statistical language model is being employed by the speech recognition component at 918. For example, in at least some implementations, the speech recognition component (or "build") under evaluation may use a statistical language model that assigns a probability to a sequence of m words (e.g., $P(w1, \ldots, wm)$) by means of a probability distribution. Alternately, the speech recognition component may use a non-statistical language model, such as a rule-based grammar model (e.g., context-free grammar (CFG) models, phrase structure grammar models, recurrent neural networks (RNN), etc.), or any other non-statistical language model.

If a statistical language model is not being used (e.g., the developer's "build" uses a non-statistical language model, such as rule-based language model, etc.), then the evaluation process 900 proceeds to one or more emulation operations at 920. In at least some implementations, the one or more emulation operations at 920 include emulating one or more speech utterances and applying those emulated utterances to the speech recognition component for systematically checking and debugging the speech recognition process of the particular "build." More specifically, the one or more emulation operations (at 920) may assume that the acoustic model of the speech recognition component is performing perfectly, and that all recognition errors are attributable to the language model. In at least some implementations, the one or more emulation operations (at 920) involve emulating perfect speech for debugging the language model aspects of the speech recognition process, and ignore (temporarily) the possible imperfections of the acoustic model.

With continued reference to FIG. 9A, following the emulation operations at 920, the evaluation process 900 determines whether each "failed case" has passed the one or more emulation operations at 922. For example, in at least some implementations, the evaluation process 900 may determine that a case has not passed the emulation operations if one or more speech recognition errors continue to occur even though perfect speech is being provided to the language model.

Those cases that did not pass the one or more emulation operations (at 922) may then be analyzed using one or more static "out of grammar" (OOG) analysis operations at 924. For example, in at least some implementations, the one or more static "out of grammar" analysis operations at 924 may determine that the particular perfect speech (e.g., word, phrase, etc) for which an emulation failure occurred is not present in the grammar of the language model, and may make appropriate recommendations for corrective action. In alternate implementations, if the language model of the speech recognition component is based on a model other than a statistical language model (e.g., a rule-based model, a context-free grammar (CFG) model, recurrent neural networks (RNN), etc.), the one or more static "out of grammar" analysis operations at 924 may include, for example, determining missing words, determining wrong order of words, determining incomplete paths in the rules, or other possible analysis operations. The example evaluation process 900 analyzes and interprets the results of the one or more static "out of grammar" analysis operations at 926, and one or more recommendations regarding how to potentially correct the speech recognition errors by one or more adjustments to the grammar model of the "build" are provided at 928. The evaluation process 900 then proceeds (via tab A) to a termination (or continue to other operations) at 908 (see FIG. 9B).

Returning now to the one or more determination operations at 918 of FIG. 9A, if it is determined that a statistical language model is being employed by the speech recognition component at 918, then the evaluation process 900 performs one or more dictionary (or spelling) check operations on the speech recognition results at 930. In at least some implementations, the one or more dictionary (or spelling) check operations at 930 may also be performed on the reference results to verify the accuracy of the reference results. In at least some implementations, the one or more dictionary check operations (at 930) may include one or more unigram checking operations to verify the accuracy of the transcriptions of the speech recognition results and the reference results. For cases that fail the one or more dictionary (or spelling) check operations (at 930), the evaluation process 900 may categorize such cases as "transcription error" cases and, in at least some implementations, divide them between those cases that involve a failure of the speech recognition results (referred to as "Reco Fail" in FIG. 9A) and those cases that involve a failure of the reference results (referred to as "Ref Fail" in FIG. 9A).

For those cases involving transcription errors attributable to a failure of the reference results (referred to as "Ref Fail" in FIG. 9A), the example evaluation process 900 performs one or more analysis or interpretation operations on the transcription errors at 932. In at least some implementations, the one or more analysis or interpretation operations at 932 may include one or more text normalization operations which at least partially define what is considered to be a word by the speech recognition component. In at least some implementations, the one or more text normalization operations may include one or more of the text normalization operations described, for example, in "A Phrase-Based Statistical Model for SMS Text Normalization," by Aiti Aw et al, Proceedings of the COLING/ACL 2006", pp. 33-40 (July 2006), or in "Text Normalization and Speech Recognition in French" by Gilles Adda et al., Proceedings ESCA Eurospeech 1997, Vol. 5, pp. 2711-2714. The evaluation process 900 may then provide one or more recommendations for possible correction of such transcription errors of the reference results at 934. The evaluation process 900 then proceeds (via tab A) to a termination (or may continue to other operations) at 908 (see FIG. 9B).

Alternately, for those cases involving transcription errors of the speech recognition results from the speech recognition component (referred to as "Reco Fail" in FIG. 9A), the example evaluation process 900 categorizes such cases as candidates for further analysis of both the language model (LM) and the linguistic analysis aspects of the speech recognition component at 936. The evaluation process 900 then proceeds to one or more operations associated with analyzing the linguistic analysis aspects of the speech recognition component (via Tab B), and to one or more operations associated with analyzing the language model of the speech recognition component (via Tab C).

For those cases that the example evaluation process 900 categorizes as candidates for further analysis of the linguistic analysis aspects of the speech recognition component (at 936 of FIG. 9A), with reference now to FIG. 9B, the evaluation process 900 proceeds from Tab B to one or more operations associated with analyzing the linguistic analysis aspects of the speech recognition component at 960. In at least some implementations, the one or more operations associated with analyzing the linguistic analysis aspects of the speech recognition component includes one or more operations to analyze one or more word types at 962. For example, in at least some implementations, the one or more operations to analyze one or more word types may include assessing whether the speech recognition component (or "build") is properly compounding words. More specifically, the assessment of compounding words may include determining whether the speech recognition component is correctly, logically, or rationally joining together words in a compound fashion to achieve compound terms having one or more appropriate meanings.

In other implementations, the one or more operations to analyze one or more word types at 962 may be directed to word types other than compound words, such as foreign versus native words, name entities such as proper nouns (e.g., personal names, product names, etc.), numbers, function words, content words, derived words, inflected words, clitic forms, acronyms pronounced letter-by-letter, likely typos in reference or recognition result string, out-of-vocabulary (OOV) words, gender, background noise, or dialect, or any other suitable word types.

In at least some implementations, the one or more operations to analyze one or more word types at 962 may provide one or more separate word error recognition (WER) scores by category to support one or more corrective actions, ranging from granular, targeted feedback for refining the one or more models, lexicons, and other components used by the speech recognition component. Such word error recognition scores may provide understanding on one or more areas for possible corrective action, and may add (or recommend to add) one or more types of addition data to be added to the training data so that the developer's "build" may be trained (or re-trained) using more targeted or specific training data to address the recognition errors associated with at least some of the transcription error cases.

Figure 10:
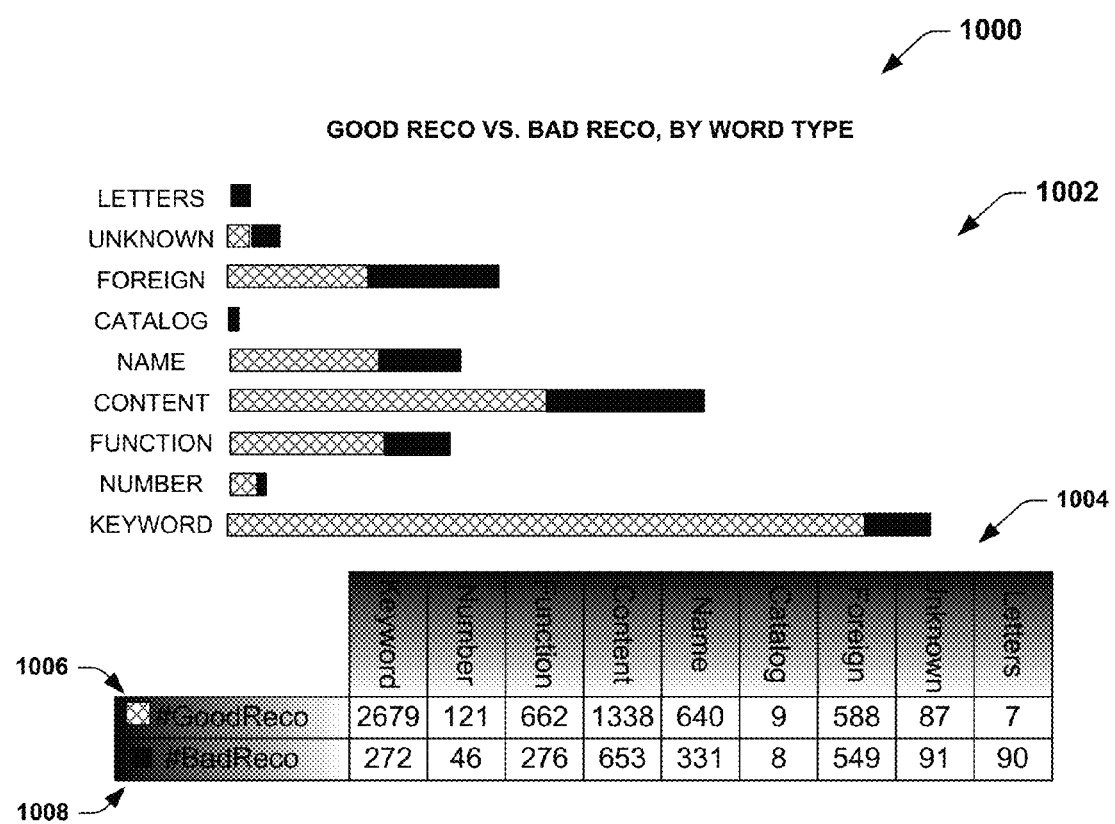
FIG. 10 illustrates an embodiment of a set of recognition error diagnostic results associated with one or more word type analysis operations.

For example, FIG. 10 shows an embodiment of a set of analysis results 1000 of one or more word type analysis operations (at 962) that may be output from the example evaluation process 900. In this example, the results 1000 provide a bar chart 1002 and a numerical table 1004 that display both successful results 1006 (e.g., "GoodReco") and unsuccessful results 1008 (e.g., "BadReco") for the following word types: letters, foreign, catalog, name, content, function, number, and keyword. It will be appreciated that the information shown on FIG. 10 may advantageously allow a user to readily compare the successful results 1006 with the unsuccessful results 1008, which may inform the developer (or other user) which types of corrective action are more likely to improve the performance of the speech recognition component. Of course, it will be appreciated that the information shown in FIG. 10 is merely one possible example, and that in alternate implementations, the results of the one or more word type analysis operations (at 962) may include other types of information, and may be presented in any other suitable way.

Referring again to FIG. 9B, if the speech recognition component is not properly handling one or more word types (e.g., compound words, foreign words, proper nouns, etc.), then the example evaluation process 900 may provide one or more recommendations that may possibly correct such word type errors at 964. For example, in at least some implementations, the evaluation process 900 may recommend that one or more new features (or sub-processes) may be added to the speech recognition component to attempt to properly handle the errors associated with one or more particular word types at 964. In other implementations, the evaluation process 900 may recommend other suitable alternatives, including, for example, collecting and adding new data to train the acoustic model or language model of the speech recognition component, or any other suitable recommendations.

Referring again to FIG. 9B, the example evaluation process 900 performs one or more transcription error analysis operations at 966. If the analysis of transcription errors (at 966) determines that transcription errors are not being properly determined, then the evaluation process 900 may optionally provide a recommendation to correct one or more current data files of the speech recognition component to account for one or more particular cases at 968. Alternately, the evaluation process 900 may optionally provide a recommendation to provide the speech recognition component with more data at 969, such as by adding words which are currently not in the component's lexicon, adding possessive words, adding (or modifying) one or more other words or word types suitable for resolving particular transcription errors, or other suitable recommendations. For example, if the one or more transcription error analysis operations at 966 indicate that a relatively high number of errors are occurring because one or more words are not in a language model (LM) of the speech recognition component, the evaluation process 900 may identify that deficiency and may recommend that the one or more relevant words be added into the language model, or that one or more pronunciations be added to the lexicon to address these errors.

Thus, in at least some implementations, the one or more linguistic analysis operations (at 960) may provide improved performance of the speech recognition component (or build). For example, the one or more linguistic analysis operations may improve one or more parameters, engine settings, or other aspects of the linguistic analysis that enables the speech recognition component to provide improved performance. Such performance improvements may include providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

Following the one or more linguistic analysis operations (at 960), the evaluation process 900 may proceed (via Tab A) to termination, or may continue to one or more other operations, at 908. For example, as described above with reference to FIG. 4, in at least some implementations, the evaluation process 900 may automatically adjust one or more aspects or parameters of the speech recognition component (e.g., operation 420) (e.g., in accordance with one or more recommendations of the evaluation process 900), and may repeat one or more previous operations of the example evaluation process 900 to iteratively evaluate whether the performance of the speech recognition component has been improved.

For those cases that the evaluation process 900 categorizes as candidates for further analysis of the language model (LM) (at 936 of FIG. 9A), the evaluation process 900 proceeds to one or more operations associated with analyzing the language model of the speech recognition component (via Tab C). More specifically, in at least some implementations as shown in FIG. 9B, the example evaluation process 900 includes an engine analysis portion 970 that includes (beginning at Tab C) the one or more additional operations associated with analyzing the language model of the speech recognition component (or "build").

In at least some implementations, the one or more additional operations associated with analyzing the language model includes one or more pronunciation lexicon analysis operations at 972. In at least some implementations, a pronunciation lexicon is a collection of words or phrases together with their pronunciations specified using an appropriate pronunciation alphabet. For example, in at least some implementations, a pronunciation lexicon may be a Pronunciation Lexicon Specification (PLS), or any other suitable type of lexicon. In some implementations, an application-specific pronunciation lexicon may be required in a situation where a pre-selected (or default) lexicon supplied for a given speech recognition component does not cover the vocabulary of the application.

In at least some implementations, the one or more one or more pronunciation lexicon analysis operations (at 972) may include modifying the pronunciation lexicon of the speech recognition component by adding (or modifying or supplementing) a particular vocabulary pronunciation to the pronunciation lexicon. If the one or more pronunciation lexicon analysis operations (at 972) determine that a case is correctable via one or more pronunciation analysis operations (at 972), then the evaluation process 900 may recommend one or more fixes to the pronunciation lexicon at 973.

As further shown in FIG. 9B, the example evaluation process 900 includes one or more language model (LM) parameter adjustment operations at 974 to assess which of the one or more parameters of the language model may be causing or contributing to the speech recognition errors of the case. More specifically, in at least some implementations, the one or more language model parameter adjustment operations (at 974) may include selectively modifying the one or more language model parameters (e.g., according to a known language model, such as an industry-standard Advanced Research Projects Administration (ARPA) language model), and monitoring a result of such selective adjustment to determine whether the adjustment corrects the speech recognition error associated with a particular error.

If the one or more language model parameter adjustment operations (at 974) determine that the case is correctable via one or more language model parameter adjustments, then the evaluation process 900 may provide a recommendation of one or more adjustments (or fixes) to one or more parameters of the language model at 975.

With continued reference to FIG. 9B, in this implementation, the language model analysis operations of the evaluation process 900 further includes one or more text normalization (TN) operations at 976. In at least some implementations, the "text normalization" defines what is considered to be a word by a particular speech recognition component. The "text normalization" definition of a speech recognition component (or "build") may therefore measure different lexical coverages and language model perplexities, both of which may be related to speech recognition accuracies. In addition, in at least some implementations, text normalization may also be used to standardize multiple display forms having the same meaning into one display form so that the language model may be more robust. For example, in at least some implementations, the one or more text normalization operations (at 976) may normalize "1" to "one" so that both "1" and "one" will be treated as the same token and the language model will be more robust handling the meaning of "one" because of a combined score. On the other hand, if the one or more text normalization operations (at 976) do not normalize "1" to "one," then the language model may receive half data as "1" and the other half as "one," which splits the language model score in half and the speech recognition component may not learn the concept of "one" as well.

During the one or more text normalization operations (at 976), if it is determined that a recognition error can be remedied by the addition of one or more specific terms into the text normalization lexicon, then the example evaluation process 900 may optionally recommend that such one or more specific terms be included into the lexicon at 977. Alternately or additionally, the evaluation process 900 may optionally recommend that additional training data be provided to the language model to attempt to correct the recognition error at 978.

In at least some implementations, the one or more language model analysis operations of the evaluation process 900 may optionally include entering a "human intervention" or "manual input" phase at 980. For example, the "human intervention" phase at 980 may include having a user (e.g., the developer or other person) analyze the results and recommendations provided by the evaluation process 900 and optionally preforming one or more adjustments to the language model based on human judgment at 981, and may further include optionally conducting one or more focused language data training operations based on human judgment at 982. In further implementations, the human intervention phase 980 may include other operations, or may be omitted.

In at least some implementations, the one or more language model analysis operations may provide improved performance of the speech recognition component (or build). For example, the one or more language model analysis operations may improve one or more parameters, engine settings, or other aspects of the language model that enables the speech recognition component to provide improved performance. Such performance improvements may include providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

Returning now to FIG. 9A, in the example evaluation process 900, the cases that successfully pass the one or more dictionary (or spelling) check operations (at 930), and the cases that successfully pass the one or more emulation operations (at 922), are further analyzed using one or more force alignment operations at 938. In at least some implementations, the one or more force alignment operations at 938 include taking a text transcription of an audio segment (i.e. the reference result) and determining where in time one or more particular words occur in the audio segment, comparing those results with the speech recognition results from the speech recognition component (or "build"), and determining whether each case from the speech recognition component is acceptable (e.g., "pass") or not acceptable (e.g., "fail") from an alignment perspective. For example, in at least some implementations, the one or more force alignment operations at 938 may determine that a case is acceptable if at least a portion of the one or more words is reasonably closely aligned (e.g., over 50% aligned, over 75% aligned, etc.) with the reference result.

The cases that "fail" the one or more force alignment operations (at 938) are designated as candidates for further analysis of both a transcription model, and also an acoustic model (AM), of the speech recognition component at 940. The evaluation process 900 then proceeds to one or more additional operations associated with analyzing the acoustic model of the speech recognition component (via Tab D), and also and also to one or more additional operations associated with analyzing the transcription model of the speech recognition component (via Tab G).

With reference to FIG. 9B, the example evaluation process 900 further includes one or more acoustic model analysis operations (beginning at Tab D). In at least some implementations, the one or more acoustic model analysis operations includes one or more lexicon analysis operations at 983. In at least some implementations, the internal lexicon of a speech recognition process (or "build") specifies which words in a language can be recognized or spoken, and defines how an acoustic model expects a word to be pronounced (typically using characters from a single phonetic alphabet). The one or more lexicon analysis operations at 983 may assess whether a particular recognition error may be attributable to one or more deficiencies of the lexicon of the acoustic model, and if so, optionally provides one or more recommendations to correct or modify the lexicon accordingly at 984.

In at least some implementations, the acoustic model analysis operations include one or more "letter-to-sound" (LTS) analysis operations at 985. In at least some implementations, a letter-to-sound parameter of a speech recognition component is a decoder parameter that allows the parameter to convert between letters and sounds (and vice versa). If it is determined that the recognition error may be correctable via one or more adjustments to the LTS parameter(s) (at 985), then the evaluation process 900 may recommend one or more adjustments (or fixes) to one or more LTS parameters of the acoustic model at 986.

The acoustic model analysis operations further include one or more operations associated with adjustments of one or more acoustic model parameters at 987. For example, the evaluation process 900 selectively (or systematically) adjusts one or more parameters of the acoustic model (at 987) to assess which of the one or more parameters may be causing or contributing to the speech recognition errors of the "failing case." In at least some implementations, the one or more parameter adjustment operations (at 987) may include, for example, selectively modifying the one or more parameters according to a known acoustic model, and monitoring a result of such selective adjustment to determine whether the adjustment corrects the speech recognition error. If it is determined that the speech recognition error is correctable via one or more acoustic model parameter adjustments (at 987), then the evaluation process 900 may recommend one or more adjustments (or fixes) to the parameters of the acoustic model at 988, and may further recommend that additional training data be provided to attempt to correct the speech recognition error at 989.

As further shown in FIG. 9B, the one or more acoustic model analysis operations may optionally include entering the "human intervention" or "manual input" phase at 980. For example, as noted above, the "human intervention" phase at 980 may include having a user (e.g., the developer or other person) analyze the results and recommendations provided by the evaluation process 900 and optionally preforming one or more adjustments to the language model based on human judgment at 981, and may further include optionally conducting one or more focused language data training operations based on human judgment at 982. In further implementations, the human intervention phase 980 may include other operations, or may be omitted.

In at least some implementations, the one or more acoustic model analysis operations may provide improved performance of the speech recognition component (or build). For example, the one or more acoustic model analysis operations may improve one or more parameters, engine settings (e.g., LTS parameter), or other aspects of the acoustic model that enables the speech recognition component to provide improved performance Such performance improvements may include providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

As further shown in FIG. 9B, the engine analysis portion 970 of the example evaluation process 900 further includes one or more transcription model analysis operations (beginning at Tab G). In at least some implementations, the one or more transcription model analysis operations includes one or more transcription error analysis operations at 996. For example, in at least some implementations, the one or more transcription error analysis operations (at 996) may assess whether the word as recognized by the speech recognition component is in a dictionary of the speech recognition component but is not what was input in the sample of test utterances. If it is determined that the recognition error is correctable via one or more adjustments to the transcription model (at 996), then the evaluation process 900 may recommend one or more adjustments (or fixes) to the transcription model at 998. In some implementations, the transcription analysis operations at 996 may be similar to the transcription analysis operations performed at 932 of the linguistic analysis operations 960, and the transcription recommendation operations performed at 998 may be similar to the transcription recommendation operations performed at 934 of the linguistic analysis operations 960.

In addition, as shown in FIG. 9B, the one or more additional operations associated with analyzing the transcription model of the developer's "build" may optionally include entering the "human intervention" or "manual input" phase at 980. As described above, in at least some implementations, the "human intervention" phase (at 980) may include having a user (e.g., the developer or other person) analyze the results and recommendations provided by the evaluation process 900 and optionally preforming one or more adjustments to the transcription model based on human judgment at 981, and may further include optionally conducting one or more focused language data training operations based on human judgment at 982.

As further shown in FIG. 9B, the one or more transcription model analysis operations may optionally include entering the "human intervention" or "manual input" phase at 980. For example, as noted above, the "human intervention" phase at 980 may include having a user (e.g., the developer or other person) analyze the results and recommendations provided by the evaluation process 900 and optionally preforming one or more adjustments to the language model based on human judgment at 981, and may further include optionally conducting one or more focused language data training operations based on human judgment at 982. In further implementations, the human intervention phase 980 may include other operations, or may be omitted.

In at least some implementations, the one or more transcription model analysis operations may provide improved performance of the speech recognition component (or build). For example, the one or more transcription model analysis operations may improve one or more parameters, engine settings, or other aspects of the transcription model that enables the speech recognition component to provide improved performance. Such performance improvements may include providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

Returning now to FIG. 9A, for the cases that "pass" the one or more force alignment operations at 938, the evaluation process 900 proceeds to perform "1:1" alignment operations on such cases at 942. More specifically, in at least some implementations, the "1:1" alignment operations may include providing only a reference result and a first recognition result in the grammar, and then requiring the speech recognition component to choose between only these two possibilities. The "1:1" alignment operations (at 942) may determine, for a particular recognition error, whether an audio segment better matches the results of the build's speech recognition process (e.g., "Reco wins" in FIG. 9A), or whether the audio segment better matches the reference result (e.g., "Ref wins" in FIG. 9A). In at least some implementations, the "1:1" alignment operations (at 942) may be configured to reduce the complexity of grammar to obtain an acoustic model (AM) score with minimum impact from grammar.

As further shown in FIG. 9A, the example evaluation process 900 receives the results of the alignment operations (e.g., at 942) and performs one or more language model (LM) scoring calculations at 944 for both the reference results (e.g., test utterances 902) and for the recognition results provided by the speech recognition component (or "build"). As describe above, a language model typically determines a probability (or score) that an associated segment of speech is a particular word or sequence of words. It will be appreciated that the language model scores may be calculated using a large number of suitable methods, including but not limited to, for example, one or more of the methods described in "Statistical Language Models for Information Retrieval: A Critical Review," by Cheng Xiang Zhai, published at "Foundations and Trends in Information Retrieval," Vol. 2, No. 3, pp. 137-213 (2008) (DOI:10.1561/1500000008). In at least some implementations, the one or more language model scoring calculations (at 944) may generally be determined as follows:

$$P(A,B)=P(A)*P(B/A) \quad (1)$$

where P represents a probability associated with words A and B.

In some implementations, when the language model is a non-statistical language model (e.g., a rule-based model, a context-free grammar (CFG) model, recurrent neural networks (RNN), etc.), the language model scores may be a non-statistical language model scores (e.g., CFG scores, RNN scores, etc.). In addition, when the non-statistical language model uses context-free grammar (CFG) (and not combining LM inside), the output scores may depend on one or more weighting factors in a path of one or more rules in the context-free grammar (CFG) model.

In at least some implementations, the language model (LM) scoring calculations (at 944) determine a score for the language model using the reference (or known) utterance (e.g., "LM(Ref)" of FIG. 9A) and a score for the language model using the speech recognition results provided by the developer's "build" (e.g., "LM(Reco)" of FIG. 9A). More specifically, in at least some implementations, the language model scoring calculations are determined as follows:

$$LM(Ref)=P(Ref)*P(Reco/Ref) \quad (2)$$

$$LM(Reco)=P(Reco)*P(Ref/Reco) \quad (3)$$

These results enable one or more comparisons between the language model scores using both the reference utterances and the actual speech recognition results (e.g., LM(Ref)>LM(Reco), LM(Ref)<LM(Reco), etc.).

In at least some implementations, the one or more language model scoring operations (at 944) may compute one or more of a reference perplexity calculation, a reference language model score, a reference language model "Path" value, and a perplexity calculation associated with the recognition result. More specifically, in at least some implementations, the language model "Path" value may track the order of "ngram" applied for that utterance. For example, if the order is higher such as from trigram instead of unigram, the path count for this case will typically be higher, and the higher the order, the wider the context the machine is learning and may therefore lead to improved speech recognition accuracy.

As further shown in FIG. 9A, the evaluation process 900 receives the results of the alignment operations (e.g., at 942) and performs one or more acoustic model (AM) scoring calculations on the recognition errors at 946 using both the reference results (e.g., test utterances 902) and the recognition results provided by the speech recognition component. Similar to the language model scores described above, an acoustic model also determines a probability (or score) that an associated segment of speech is a particular word or sequence of words. Again, it will be appreciated that the acoustic model scores may be calculated using a large number of suitable methods, including but not limited to, for example, one or more of the methods described in "Confidence Scores for Acoustic Model Adaptation," by Christian Gollan and Michiel Bacchiani, Jounral of the IEEE, at 1-4244-1484-9/08, pp. 4289-4292 (2008), or one or more of the methods described in "Investigations of Issues for Using Multiple Acoustic Models to Improve Continuous Speech Recognition," by Rong Zhang and Alexander I. Rudnicky, Computer Science Department, School of Computer Science, Carnegie Mellon University, 2006. In at least some implementations, the one or more acoustic model scoring calculations (at 944) may be determined (based on Equation (1) above) as follows:

$$AM(Ref)=P(Ref)*P(Reco/Ref) \quad (4)$$

$$AM(Reco)=P(Reco)*P(Ref/Reco) \quad (5)$$

The acoustic model scoring calculations (at 946) may determine a score for the acoustic model using the reference results (e.g., "AM(Ref)" of FIG. 9A) and a score for the acoustic model using the recognition results (e.g., "AM (Reco)" of FIG. 9A). These results enable one or more comparisons between the acoustic model scores using both the reference utterances and the actual speech recognition results (e.g., AM(Ref)>AM(Reco), AM(Ref)<AM(Reco), etc.).

The example evaluation process 900 analyzes the results of the previous analysis operations and determines one or more appropriate courses of action at 948. For example, in at least some implementations, the analyzing and determining operations (at 948) of the evaluation process 900 may include interpreting a combination of the results of the language model (LM) scoring operations (at 944), and the results of the acoustic model (AM) scoring operations (at 946) to determine one or more appropriate courses of action (at 948). In further implementations, the interpreting of the results of the one or more analysis operations (at 948) may include interpreting one or more combinations of other analysis results (e.g., penalty/engine setting check results at 910, force alignment results at 938, 1:1 alignment tests at 942, language model scoring results at 944, acoustic model scoring results at 946, emulation results at 920, dictionary (or spell) check results at 930, etc.).

More specifically, in at least some implementations, the analyzing and determining operations (at 948) of the evaluation process 900 may include determining whether a case falls within a particular error category based on a combination of language model scores and acoustic model scores, as illustrated in Table A. In other implementations, the analyzing and determining operations (at 948) of the evaluation process 900 may take into account one or more other analysis results (e.g., penalty/engine setting check results at 910, force alignment results at 938, 1:1 alignment tests at 942, language model scoring results at 944, acoustic model scoring results at 946, emulation results at 920, dictionary (or spell) check results at 930, etc.) when determining whether a case falls within a particular error category. Thus, in at least some implementations, the one or more operations associated with analyzing scores and selecting one or more courses of action (at 948) may categorize each of the recognition errors (or "failing cases") into various error categories, and may select one or more appropriate courses of action based on the categorization, and as described more fully below.

TABLE A

Possible Error Categories Based on Combined LM Scoring Results and AM Scoring Results

|  | AM(Ref) < AM(Reco) | AM(Ref) > AM(Reco) |
| --- | --- | --- |
| LM(Ref) < LM(Reco) | AM/LM at 950 | LM/Pruning at 952 |
| LM(Ref) > LM(Reco) | AM at 954 | Penalty at 956 |

More specifically, in at least some implementations, if the language model scoring operations (at 944) show that the score for the language model using the reference result is lower than the language model score using the recognition result from the speech recognition component (i.e. LM(Ref) <LM(Reco)), and if the acoustic model scoring operations (at 946) show that the score for the acoustic model using the reference result is lower than the acoustic model score using the recognition result from the speech recognition component (i.e. AM(Ref)<AM(Reco)), then the evaluation process 900 may determine (at 948) that such recognition error is an appropriate case for further analysis of both the acoustic model (AM) and also the language model (LM) of the speech recognition component. The example evaluation process 900 then proceeds at 950 to one or more language model analysis operations (via Tab C, as described above with reference to FIG. 9B), and also to one or more acoustic model analysis operations (via Tab D, as described above with reference to FIG. 9B).

Alternately, in at least some implementations, the language model scoring operations (at 944) show that the score for the language model using the reference result is lower than the language model score using the speech recognition result (i.e. LM(Ref)<LM(Reco)), and if the acoustic model scoring operations (at 946) show that the score for the acoustic model using the reference result is greater than the acoustic model score using the speech recognition result (i.e. AM(Ref)>AM(Reco)), then the evaluation process 900 may determine (at 948) that such recognition error is a candidate for further analysis of both the language model (LM) of the speech recognition component, and also a candidate for one or more pruning model analysis operations. The evaluation process 900 then proceeds at 952 to one or more language model analysis operations (via Tab C, as described above with reference to FIG. 9B), and also to one or more pruning model analysis operations (via Tab E), which operations will be described more fully below with reference to FIG. 9B.

With continued reference to FIG. 9A, in at least some implementations, if the language model scoring operations (at 944) show that the score for the language model using the reference result is greater than the language model score using the speech recognition result (i.e. LM(Ref)>LM (Reco)), and if the acoustic model scoring operations (at 946) show that the score for the acoustic model using the reference result is lower than the acoustic model score using the speech recognition result (i.e. AM(Ref)<AM(Reco)), then the evaluation process 900 may determine (at 948) that such "failing case" is a candidate for one or more acoustic model analysis operations. The example evaluation process 900 then proceeds at 954 to one or more acoustic model analysis operations (via Tab D, as described above with reference to FIG. 9B).

In at least some implementations, if the language model scoring operations (at 944) show that the score for the language model using the reference result is greater than the language model score using the speech recognition result (i.e. LM(Ref)>LM(Reco)), and if the acoustic model scoring operations (at 946) show that the score for the acoustic model using the reference result is greater than the acoustic model score using the speech recognition result (i.e. AM(Ref)>AM(Reco)), then the evaluation process 900 may determine that such "failing case" is a candidate for one or more penalty model analysis operations. The evaluation process 900 then proceeds at 956 to one or more penalty model analysis operations (via Tab F, as described more fully below with reference to FIG. 9B).

It will be appreciated that in those circumstances wherein the results of the language model (LM) scoring operations, or the results of the acoustic model (AM) scoring operations for both the speech recognition result (i.e. "Reco") and the reference result (i.e. "Ref") are equal, such results may be grouped together with one or the other of the alternate possibilities without departing from the spirit or scope of the teachings of the present disclosure. For example, if a particular "failing case" has language model scores such that "LM(Reco)" is equal to "LM(Ref)," then in some implementations such a case may be treated as an "LM(Reco)>LM(Ref)" case, and in other implementations, such a case may be treated as an "LM(Reco)<LM(Ref)" case. Similarly, if a particular "failing case" has acoustic model scores such that "AM(Reco)" is equal to "AM(Ref)," then in some implementations such a case may be treated as an "AM(Reco)>LM(Ref)" case, and in other implementations, such a case may be treated as an "AM(Reco)<AM (Ref)" case.

As noted above, the example evaluation process 900 may proceed (at 952) to one or more operations associated with analyzing a pruning model of the speech recognition component (via Tab E). With reference now to FIG. 9B, the engine analysis portion 970 of the evaluation process 900 includes one or more pruning model analysis operations (beginning at Tab E). In at least some implementations, the pruning model of the speech recognition component attempts to restrict a search space of the speech recognition process as much as possible without degrading recognition accuracy. Typically, a larger search space results in increased recognition accuracy, but requires greater use of computational resources (e.g., memory use, processor use, battery use, etc.).

In at least some implementations, the one or more pruning model analysis operations (beginning at Tab E) includes one or more beam analysis operations at 990. As beam (or beam width) decreases, pruning increases (and search space decreases) but with a possible decrease in recognition accuracy. In at least some implementations, the one or more beam analysis operations (at 990) may include selectively adjusting (e.g., increasing or decreasing) the beam of the pruning model, and monitoring a result of such selective adjustment to determine whether the adjustment corrects the speech recognition error associated with a particular "failing case." If it is determined that the recognition error is correctable via one or more beam adjustments (at 990), then the evaluation process 900 may recommend one or more adjustments to the beam of the pruning model at 991.

In at least some implementations, a pruning model of a speech recognition component may include other parameters (other than beam) that may be selectively adjusted. Therefore, in at least some implementations, the example evaluation process 900 further includes one or more analysis operations associated with adjustments of one or more other pruning model parameters at 992. For example, the evaluation process 900 may selectively adjust one or more other parameters of the pruning model (at 992) (e.g., in accordance with alternate models, industry standards, etc.) to assess which of the one or more other parameters may be causing or contributing to the speech recognition error of the "failing case." If it is determined that the "failing case" is correctable via adjustment of one or more other pruning model parameters (at 992), then the evaluation process 900 may recommend one or more adjustments to one or more other parameters of the pruning model at 992. Alternately or additionally, the evaluation process 900 may recommend that additional training data be provided to attempt to correct the recognition error at 993.

In addition, as shown in FIG. 9B, the one or more pruning model analysis operations may optionally include entering the "human intervention" or "manual input" phase at 980. As described above, in at least some implementations, the "human intervention" phase (at 980) may include having a user (e.g., a developer or other person) analyze the results and recommendations provided by the evaluation process 900 and optionally preform one or more adjustments to the pruning model based on human judgment at 981, and may further include optionally conducting one or more focused language data training operations based on human judgment at 982.

In at least some implementations, the one or more pruning model analysis operations may provide improved performance of the speech recognition component (or build). For example, the one or more pruning model analysis operations may improve one or more parameters, engine settings (e.g., beam width), or other aspects of the pruning model that enables the speech recognition component to provide improved performance. Such performance improvements may include providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

As noted above, the example evaluation process 900 may proceed (at 956) to one or more operations associated with analyzing a penalty model of the speech recognition component (via Tab F). As further shown in FIG. 9B, the engine analysis portion 970 of the evaluation process 900 further includes the one or more penalty model analysis operations (beginning at Tab F). In at least some implementations, a penalty model of a speech recognition component may involve various types of penalties, including, for example, word insertion penalties, respond speed penalties, complex respond speed penalties (e.g., which measure the time for silence/pause from one or more speakers), or any other suitable penalty types. In at least some implementations, the one or more penalty model analysis operations (beginning at Tab F) includes one or more operations associated with analyzing and adjusting one or more parameters of the penalty model at 994.

For example, the settings of a word insertion model of the speech recognition component may be analyzed and selectively adjusted at 994. In at least some implementations, a word insertion penalty is a heuristic that counters a decoding algorithm's desire for shorter words and phrases, and may reduce language model scores for every word inserted. In at least some implementations, the one or more analysis and adjustment operations (at 994) may include selectively adjusting (e.g., increasing or decreasing) a word insertion rate of the word insertion model, and monitoring a result of such selective adjustment to determine whether the adjustment corrects the speech recognition error associated with a particular "failing case."

Alternately, in at least some implementations, the one or more analysis and adjustment operations (at 994) may include analysis and adjustment of other parameters of the penalty model including, for example, one or more respond speed parameters, one or more complex respond speed parameters, or any other suitable parameters. If it is determined that the "failing case" is correctable via one or more adjustments to one or more parameters of the penalty model (at 394) (e.g., word insertion rate, respond speed, etc.), then the evaluation process 900 may recommend one or more adjustments to one or more parameters of the penalty model at 995.

As further shown in FIG. 9B, the one or more penalty model analysis operations may also include entering the "human intervention" or "manual input" phase at 980. As described above, in at least some implementations, the "human intervention" phase (at 980) may include having a user (e.g., the developer or other person) analyze the results and recommendations provided by the evaluation process 900 and optionally preforming one or more adjustments to the penalty model based on human judgment at 981, and may further include optionally conducting one or more focused language data training operations based on human judgment at 982.

In at least some implementations, the one or more penalty model analysis operations may provide improved performance of the speech recognition component (or build). For example, the one or more penalty model analysis operations may improve one or more parameters, engine settings, or other aspects of the penalty model that enables the speech recognition component to provide improved performance Such performance improvements may include providing improved speech recognition accuracy, reducing speech recognition errors (or error rates), providing improved operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies.

Following the engine analysis operations (at 970), the example evaluation process 900 may proceed (via Tab A) to termination, or may continue to one or more other operations, at 908. For example, as described above with reference to FIG. 4, in at least some implementations, the evaluation process 900 may automatically adjust one or more parameters of the speech recognition component (operation 420) (e.g., in accordance with one or more recommendations of the evaluation process 900), and may repeat one or more previous operations of the evaluation process 900 to iteratively evaluate whether the speech recognition component has been improved.

Figure 11:
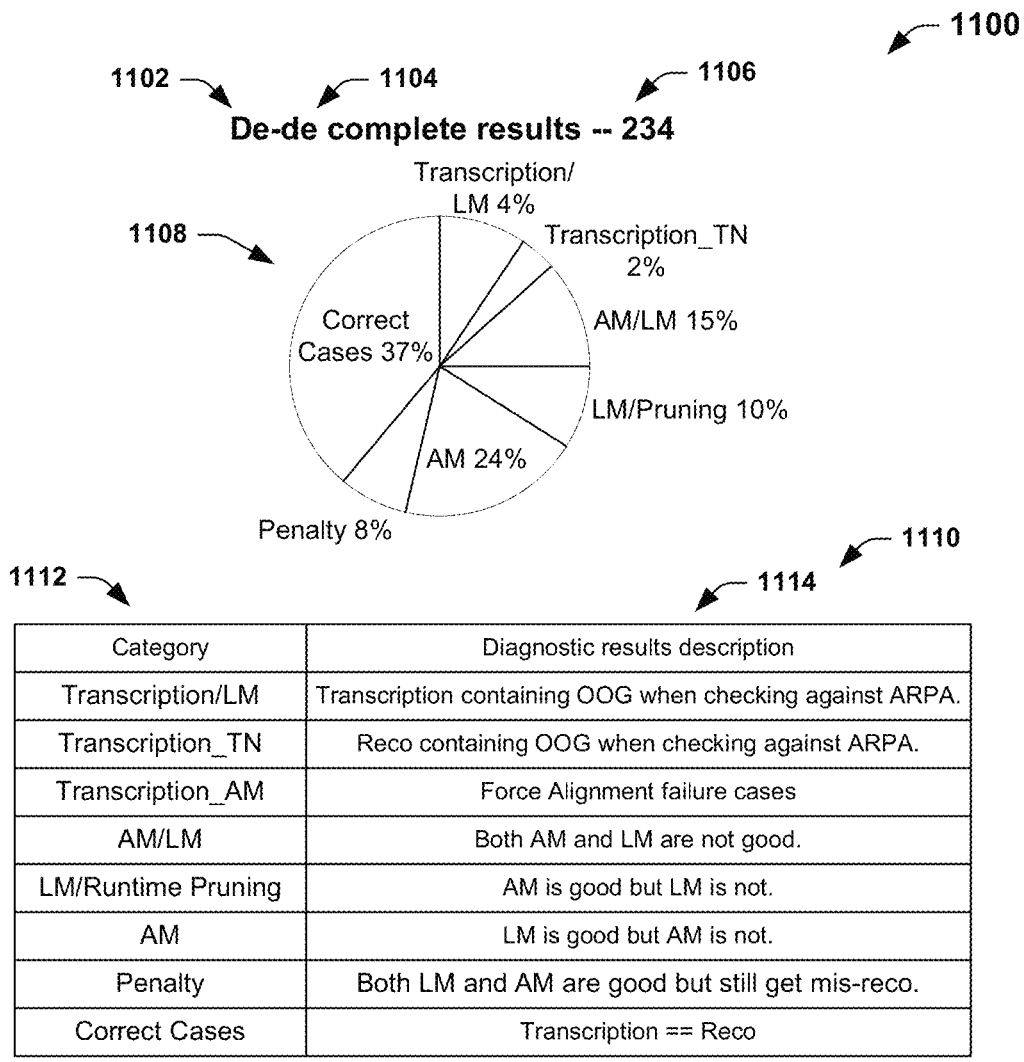
FIG. 11 shows another embodiment of a set of recognition error diagnostic results associated with an evaluation process.

As noted above, the results of the example evaluation process 900 may be provided in various forms. For example, FIG. 11 shows another embodiment of a representation 1100 of a set of results of an evaluation process (e.g., the example evaluation process 900). In this implementation, the representation 1100 indicates a language (e.g., De-German) 1102 and an associated geographic region (e.g., de-Germany) 1104 represented by a set of test utterances (e.g., reference utterances 902 of FIG. 9A) that were used to evaluate a particular speech recognition component 1106 (e.g., build "234"). In addition, a "pie chart" representation 1108 shows the statistical breakdown for the results of an evaluation process using the "234" speech recognition component (or build) 1106, (e.g., 37% correct cases, 4% errors attributable to transcription aspects of the language model (LM), 2% errors attributable to text normalization aspects of the transcription, 15% errors attributable to combined acoustic model/language model (AM/LM) aspects, 10% errors attributable to combined language model/pruning aspects, 24% errors attributable to acoustic model aspects, and 8% errors attributable to penalty model (Penalty) aspects). Of course, the results of the evaluation process shown in the "pie chart" representation 1108 are merely representative.

In addition, FIG. 11 shows a legend 1110 to assist a developer (or other user) interpret the diagnostic results of the evaluation process. More specifically, in this implementation, the legend 1110 includes a first column listing a category of evaluation error(s) 1112 shown in the "pie chart" representation 1108, and a second column providing a detailed description (or comment, recommendation, or assessment) 1114 associated with each category. Again, it will be appreciated that the error categories shown in the legend 1110 are merely representative, and that in further implementations, other error categories and descriptions may be used.

Evaluation techniques and technologies for evaluating speech recognition components in accordance with the present disclosure may provide considerable advantages over conventional techniques and technologies. As noted above, techniques and technologies for evaluating speech recognition components in accordance with the present disclosure may advantageously improve one or more parameters, engine settings, or other aspects of the speech recognition component that enables the speech recognition component to provide improved performance. Such performance improvements may include providing improved speech recognition accuracy, reducing speech recognition errors (or error rates), providing increased operating efficiencies (e.g., fewer operations requiring fewer computational cycles, less memory requirement, or other requirements), and reducing resource usage (e.g., less memory usage, less power consumption, less computational operations and hardware usage) in comparison with conventional techniques and technologies In addition, the development of software components which employ speech recognition often present substantial challenges to developers due to the variability and complexity of the incoming inputs and the modeling components involved in the speech recognition process. Evaluation techniques and technologies in accordance with the present disclosure may advantageously provide automated processes for evaluating the developer's selections for a particular speech recognition process (or "build"), and may analyze and evaluate the developer's "build" and provide information to the developer that will assist the developer in determine one or more possible causes of speech recognition errors. In addition, in at least some implementations, evaluation processes in accordance with the present disclosure may automatically adjust one or more parameters of a developer's "build" and then iteratively repeat the evaluation operations to assess whether such adjustments may be recommended or suitable for the developer's speech recognition component. Evaluation techniques and technologies in accordance with the present disclosure may therefore greatly reduce the efforts which might otherwise be required to build, tune, debug and validate such speech recognition components into viable, consumer-ready products.

Embodiments of Environments for Evaluation Processes

Processes for evaluating speech recognition components may be implemented in a variety of alternate environments. In the following section, a variety of embodiments of environments are described, including an embodiment of a computer system environment (FIG. 12), a server environment (FIG. 13), and a networked system environment (FIG. 14). It should be appreciated, however, that the embodiments of environments described herein are merely representative, and that many alternate implementations may be conceived.

Figure 12:
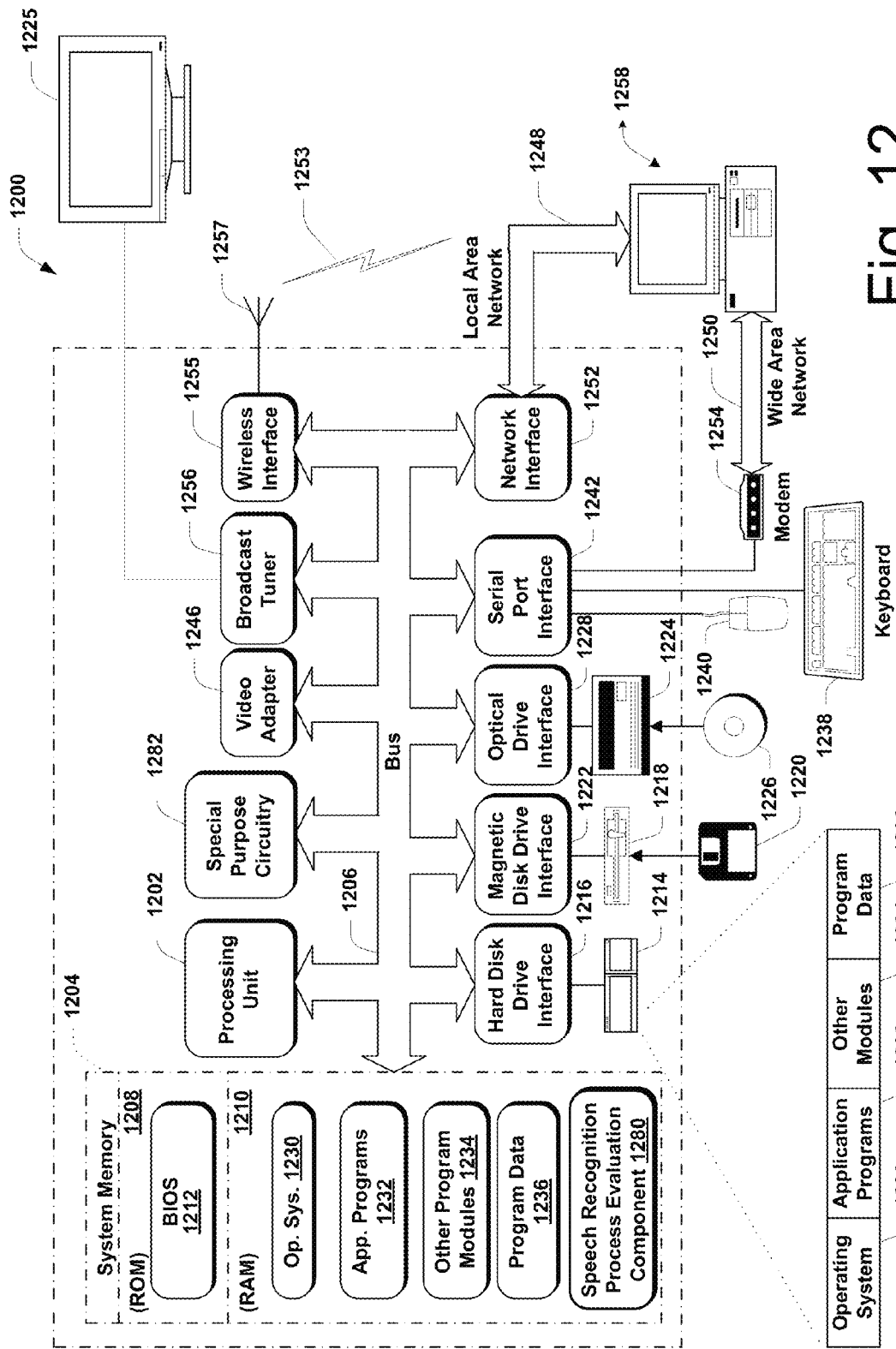
FIG. 12 shows a diagram of an embodiment of a computer system environment for performing operations associated with evaluating speech recognition components.

FIG. 12 is a diagram of an embodiment of a computer system environment 1200 for performing operations associated with evaluating speech recognition processes. As shown in FIG. 12, the example computer system environment 1200 includes one or more processors (or processing units) 1202, special purpose circuitry 1282, memory 1204, and a bus 1206 that operatively couples various system components, including the memory 1204, to the one or more processors 1202 and special purpose circuitry 1282 (e.g., ASIC, FPGA, etc.).

The bus 1206 may represent one or more of any of several types of bus structures, including a memory bus or memory controller, a peripheral bus, an accelerated graphics port, and a processor or local bus using any of a variety of bus architectures. In at least some implementations, the memory 1204 includes read only memory (ROM) 1208 and random access memory (RAM) 1210. A basic input/output system (BIOS) 1212, containing the basic routines that help to transfer information between elements within the system 1200, such as during start-up, is stored in ROM 1208.

The example system 1200 further includes a hard disk drive 1214 for reading from and writing to a hard disk (not shown), and is connected to the bus 1206 via a hard disk driver interface 1216 (e.g., a SCSI, ATA, or other type of interface). A magnetic disk drive 1218 for reading from and writing to a removable magnetic disk 1220, is connected to the system bus 1206 via a magnetic disk drive interface 1222. Similarly, an optical disk drive 1224 for reading from or writing to a removable optical disk 1226 such as a CD ROM, DVD, or other optical media, connected to the bus 1206 via an optical drive interface 1228. The drives and their associated computer-readable media may provide nonvolatile storage of computer readable instructions, data structures, program modules and other data for the system 1200. Although the system 1200 described herein employs a hard disk, a removable magnetic disk 1220 and a removable optical disk 1226, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 12, a number of program modules may be stored on the memory 1204 (e.g., the ROM 1208 or the RAM 1210) including an operating system 1230, one or more application programs 1232, other program modules 1234, and program data 1236 (e.g., the data store 1220, image data, audio data, three dimensional object models, etc.). Alternately, these program modules may be stored on other computer-readable media, including the hard disk, the magnetic disk 1220, or the optical disk 1226. For purposes of illustration, programs and other executable program components, such as the operating system 1230, are illustrated in FIG. 12 as discrete blocks, although it is recognized that such programs and components reside at various times in different storage components of the system 1200, and may be executed by the processor(s) 1202 or the special purpose circuitry 1282 of the system 1200.

A user may enter commands and information into the system 1200 through input devices such as a keyboard 1238 and a pointing device 1240. Other input devices (not shown) may include a microphone, joystick, game pad, satellite dish, scanner, or the like. These and other input devices are connected to the processing unit 1202 and special purpose circuitry 1282 through an interface 1242 that is coupled to the system bus 1206. A monitor 1225 (e.g., display 1225, or any other display device) may be connected to the bus 1206 via an interface, such as a video adapter 1246. In addition, the system 1200 may also include other peripheral output devices (not shown) such as speakers and printers.

The system 1200 may operate in a networked environment using logical connections to one or more remote computers (or servers) 1258. Such remote computers (or servers) 358 may be a personal computer, a server, a router, a network PC, a peer device or other common network node, and may include many or all of the elements described above relative to system 300. The logical connections depicted in FIG. 12 include one or more of a local area network (LAN) 1248 and a wide area network (WAN) 1250. Such networking environments are commonplace in offices, enterprise-wide computer networks, intranets, and the Internet. In this embodiment, the system 1200 also includes one or more broadcast tuners 1256. The broadcast tuner 1256 may receive broadcast signals directly (e.g., analog or digital cable transmissions fed directly into the tuner 1256) or via a reception device (e.g., via an antenna 1257, a satellite dish, etc.).

When used in a LAN networking environment, the system 1200 may be connected to the local area network 1248 through a network interface (or adapter) 1252. When used in a WAN networking environment, the system 1200 typically includes a modem 1254 or other means (e.g., router) for establishing communications over the wide area network 1250, such as the Internet. The modem 1254, which may be internal or external, may be connected to the bus 1206 via the serial port interface 1242. Similarly, the system 1200 may exchange (send or receive) wireless signals 1253 with one or more remote devices using a wireless interface 1255 coupled to a wireless communicator 1257 (e.g., an antenna, a satellite dish, a transmitter, a receiver, a transceiver, a photoreceptor, a photodiode, an emitter, a receptor, etc.).

In a networked environment, program modules depicted relative to the system 1200, or portions thereof, may be stored in the memory 1204, or in a remote memory storage device. More specifically, as further shown in FIG. 12, a speech recognition process evaluation component 1280 (e.g., speech recognition evaluation component 150 of FIG. 3) may be stored in the memory 1204 of the system 1200. The speech recognition process evaluation component 1280 may be implemented using software, hardware, firmware, or any suitable combination thereof. In cooperation with the other components of the system 1200, such as the processing unit 1202 or the special purpose circuitry 1282, the speech recognition process evaluation component 1280 may be operable to perform one or more implementations of speech recognition evaluation processes (e.g., example evaluation process 400 of FIG. 4, example diagnostic process 500 of FIG. 5, example evaluation process 900 of FIG. 9, etc.).

Figure 13:
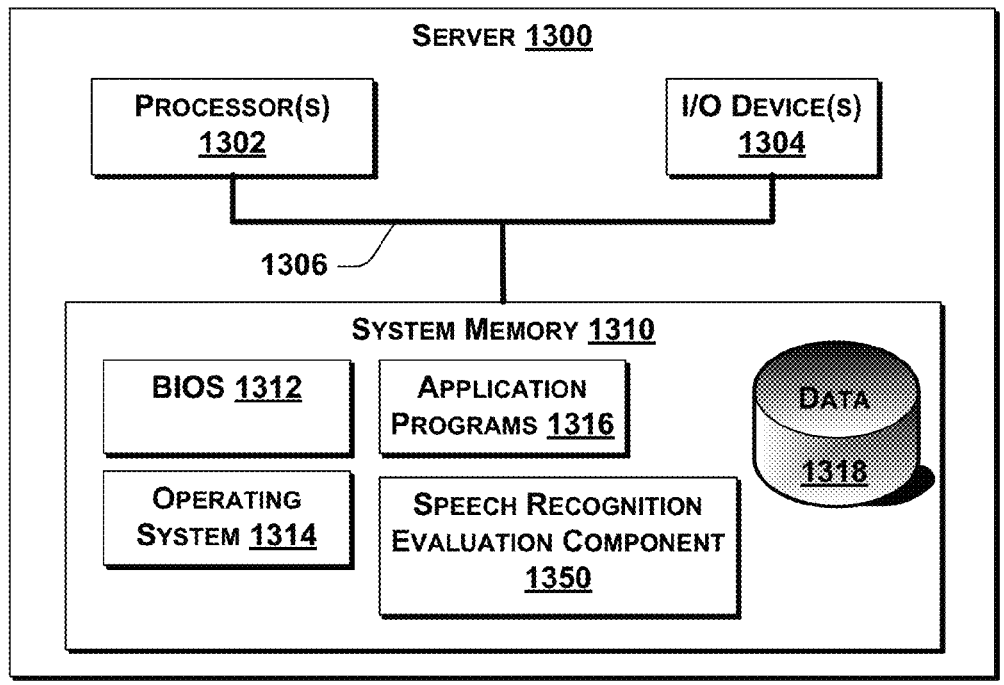
FIG. 13 illustrates an embodiment of a server environment configured for hosting a speech recognition evaluation component.
Figure 14:
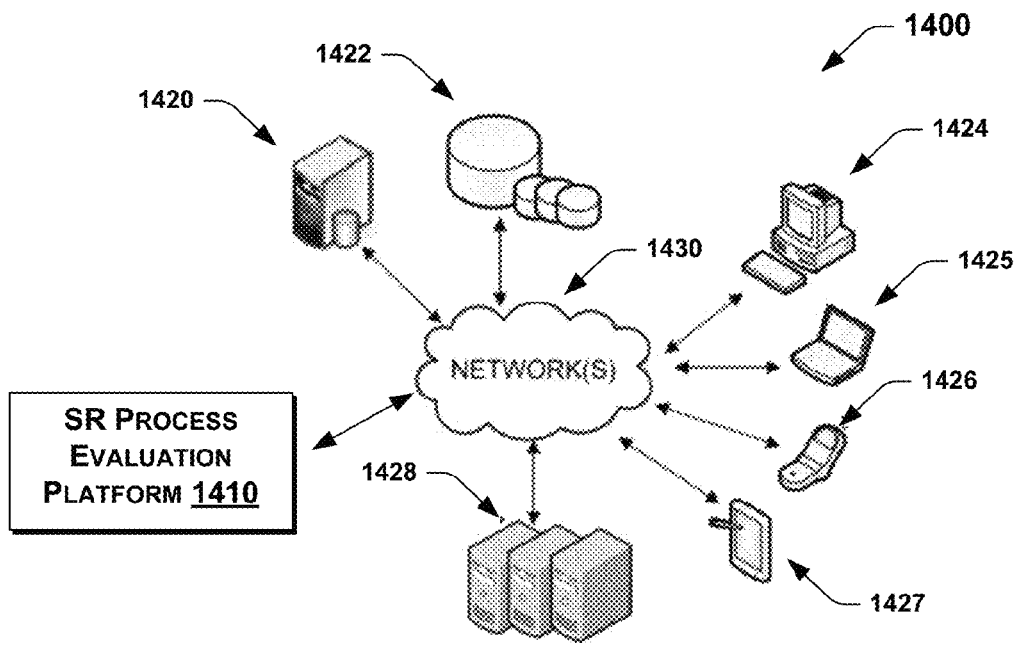
FIG. 14 illustrates an embodiment of a networked system environment for performing operations associated with evaluating speech recognition components.

FIG. 13 illustrates an embodiment of a server environment 1300 configured for hosting a speech recognition evaluation component 1350. In this implementation, the server 1300 includes one or more processing components (or processor(s)) 1302 for executing instructions that perform one or more of the operations involved in an evaluation process, and one or more input/output (I/O) components 1304 (e.g., keyboard, mouse, touch screen, transmitter, receiver, display device, communication ports and associated circuitry, etc.) coupled to a system memory 1310 by a bus 1306. The system bus 1306 represents any of several types of suitable bus structures, including a memory bus or memory controller, a peripheral bus, an accelerated graphics port, and a processor or local bus using any of a variety of bus architectures.

The system memory 1310 may include any suitable type of memory. More specifically, the system memory 1310 may include computer-readable media configured to store data, application programs, and/or program modules for implementing the operations and techniques disclosed herein that are accessible to and/or operated on by the processor 1302. For example, in the implementation shown in FIG. 13, the system memory 1310 may store a basic input/output system (BIOS) 1312, an operating system 1314, one or more application programs 1316, and program data 1318 that can be accessed by the processor 1302 and other components stored in the system memory 1310. The speech recognition evaluation component 1350 in the system memory 1310 may be operable to perform one or more implementations of speech recognition evaluation processes (e.g., example evaluation process 400 of FIG. 4, example diagnostic process 500 of FIG. 5, example evaluation process 900 of FIG. 9, etc.).

Generally, application programs and program modules executed on the example server 1300 (FIG. 13) may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

The computer-readable media included in the system memory 1310 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include propagating (or transitory) signals.

Generally, program modules executed on the example server 1300 (FIG. 13) may include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

FIG. 14 is a diagram of an embodiment of a networked system environment 1400 for performing operations associated with evaluating speech recognition components. In this implementation, the example networked system environment 1400 includes a speech recognition (SR) process evaluation platform 1410 configured to perform evaluations of speech recognition processes. More specifically, in at least some implementations, the speech recognition (SR) process evaluation platform 1410 may be a server (e.g., server 1300 of FIG. 13), a computer system (e.g., computer system 1200 of FIG. 12), or any other suitably configured platform.

As further shown in FIG. 14, one or more various client devices 1420-1428 (e.g., database servers 1420, data stores 1422, desktop computers 1424, laptop computers 1425, communication devices 1426 (e.g., cell phones, smart phones, personal data assistants, etc.), tablet (or notebook) computers 1427, servers 1428) may communicate with the speech recognition (SR) process evaluation platform 1410 via one or more networks 1430 (e.g., a LAN, WAN, a local communication system, a global communication system, the Internet, a cellular communication system, a telephonic communication system, etc.) that facilitate communications between client applications on the individual client devices 1420-1428 and the speech recognition (SR) process evaluation platform 1410. The client devices 1420-1428 may provide speech recognition results via the network(s) 1430 to the speech recognition (SR) process evaluation platform 1410. In turn, the speech recognition (SR) process evaluation platform 1410 may provide the results of recognition error diagnostics performed on the speech recognition results to assist clients with evaluating, validating, or debugging speech recognition components.

The network(s) 1430 may comprise any topology of servers, clients, Internet service providers, or other suitable communication media, and in various alternate implementations, may have a static or dynamic topology. The network(s) 1430 may include a secure network (e.g., an enterprise network), an unsecure network (e.g., a wireless open network, the Internet, etc.), and may also coordinate communication over other networks (e.g., PSTN, cellular networks, etc.). By way of example, and not limitation, the network(s) 1430 may include wireless media such as acoustic, RF, infrared and other wireless media.

Of course, other systems and environments may be implemented to perform evaluations of speech recognition components, and are not necessarily limited to the specific implementations shown and described herein.

In view of the disclosure of techniques and technologies for evaluating speech recognition components provided herein, a few representative embodiments are summarized below. It should be appreciated that the following summary of representative embodiments is not intended to be exhaustive of all possible embodiments, and that additional embodiments may be readily conceived from the disclosure of techniques and technologies for evaluating speech recognition components provided herein.

In at least some embodiments, a system for diagnosing speech recognition errors may include an error detection module configured to determine that a speech recognition result is at least partially erroneous, and a recognition error diagnostics module configured to (a) perform a first error analysis of the at least partially erroneous speech recognition result to provide a first error analysis result; (b) perform a second error analysis of the at least partially erroneous speech recognition result to provide a second error analysis result; and (c) determine at least one category of recognition error associated with the at least partially erroneous speech recognition result based on a combination of the first error analysis result and the second error analysis result.

In at least some embodiments, in any of the embodiments of systems described herein, the first error analysis may include at least one language model scoring operation, and the second error analysis may include at least one acoustic model scoring operation. In addition, in at least some embodiments, the first error analysis of the at least partially erroneous speech recognition result may include a comparison of a language model score associated with the at least partially erroneous speech recognition result with a language model score associated with a reference speech recognition result, and the second error analysis of the at least partially erroneous speech recognition result may include a comparison of an acoustic model score associated with the at least partially erroneous speech recognition result with an acoustic model score associated with the reference speech recognition result.

In at least some embodiments, in any of the embodiments of systems described herein, the first error analysis may include at least one dictionary check operation, and the second error analysis may include at least one transcription analysis operation. In at least some embodiments, in any of the embodiments of systems described herein, the first error analysis may include at least one emulation operation, and the second error analysis may include at least one grammar analysis operation.

In at least some embodiments, in any of the embodiments of systems described herein, the recognition error diagnostics module may be further configured to perform a third error analysis of the at least partially erroneous speech recognition result to provide a third error analysis result, and to determine at least one category of recognition error associated with the at least partially erroneous speech recognition result based on a combination of at least the first error analysis result, the second error analysis result, and the third error analysis result. Furthermore, in at least some embodiments, the first error analysis may include at least one language model scoring operation, the second error analysis may include at least one acoustic model scoring operation, and the third error analysis may include at least one of an engine setting check operation, a penalty model setting check operation, a force alignment operation, a 1:1 alignment test operation, an emulation operation, or a dictionary check operation.

In any of the embodiments of systems described herein, the recognition error diagnostics module may be further configured to determine at least one corrective action to at least partially correct at least one aspect of a speech recognition component based at least partially on the at least one category of recognition error associated with the at least partially erroneous speech recognition result.

In addition, in any of the embodiments of systems described herein, the recognition error diagnostics module may be further configured to provide at least one recommended action to at least partially correct at least one aspect of at least one of a language model, an acoustic model, a transcription model, a pruning model, a penalty model, or a grammar of the speech recognition component based at least partially on the at least one category of recognition error associated with the at least partially erroneous speech recognition result.

In at least some embodiments, any of the embodiments of systems described herein may further include an adjustment component configured to adjust at least one aspect of a speech recognition component based at least partially on the at least one category of recognition error associated with the at least partially erroneous speech recognition result.

In at least some embodiments, in any of the embodiments of systems described herein, the recognition error diagnostics module may be further configured to determine that the at least one category of recognition error includes at least an acoustic model error and a language model error when (a) the first error analysis result indicates that a reference language model score associated with a reference speech is lower than a recognition language model score associated with the at least partially erroneous speech recognition result, and (b) the second error analysis result indicates that a reference acoustic model score associated with the reference speech is lower than a recognition acoustic model score associated with the at least partially erroneous speech recognition result.

Furthermore, in any of the embodiments of systems described herein, the recognition error diagnostics module may be further configured to determine that the at least one category of recognition error includes at least an acoustic model error when (a) the first error analysis result indicates that a reference language model score associated with a reference speech is higher than a recognition language model score associated with the at least partially erroneous speech recognition result, and (b) the second error analysis result indicates that a reference acoustic model score associated with the reference speech is lower than a recognition acoustic model score associated with the at least partially erroneous speech recognition result.

Similarly, in any of the embodiments of systems described herein, the recognition error diagnostics module may be further configured to determine that the at least one category of recognition error includes at least an language model error and a pruning model error when (a) the first error analysis result indicates that a reference language model score associated with a reference speech is lower than a recognition language model score associated with the at least partially erroneous speech recognition result, and (b) the second error analysis result indicates that a reference acoustic model score associated with the reference speech is higher than a recognition acoustic model score associated with the at least partially erroneous speech recognition result.

Also, in any of the embodiments of systems described herein, the recognition error diagnostics module may be further configured to determine that the at least one category of recognition error includes at least a penalty model error when (a) the first error analysis result indicates that a reference language model score associated with a reference speech is higher than a recognition language model score associated with the at least partially erroneous speech recognition result, and (b) the second error analysis result indicates that a reference acoustic model score associated with the reference speech is higher than a recognition acoustic model score associated with the at least partially erroneous speech recognition result.

In at least some embodiments, an apparatus for diagnosing speech recognition errors may include at least one processing component, and one or more computer-readable media operably coupled to the at least one processing component. The one or more computer-readable media may bear one or more instructions that, when executed by the at least one processing component, perform operations including at least: performing one or more speech recognition operations to provide a speech recognition result, performing a first error analysis of the speech recognition result to provide a first error analysis result, performing a second error analysis of the speech recognition result to provide a second error analysis result, and determining at least one corrective action to at least partially increase an operability of at least one of the one or more speech recognition operations based on a combination of at least the first error analysis result and the second error analysis result.

In at least some embodiments, the one or more instructions of the above-noted apparatus may be further configured to perform operations comprising: adjusting at least one aspect of a speech recognition component based at least partially on the determined at least one corrective action. Furthermore, in at least some embodiments, the one or more instructions of any of the apparatus described herein may be configured wherein performing a first error analysis includes at least performing at least one language model scoring operation, and performing a second error analysis includes at least performing at least one acoustic model scoring operation. In addition, in at least some embodiments, determining at least one corrective action to at least partially increase an operability of at least one of the one or more speech recognition operations based on a combination of at least the first error analysis result and the second error analysis result may include determining at least one corrective action to at least one of reduce a speech recognition error of at least one of the one or more speech recognition operations, increase a computational efficiency of at least one of the one or more speech recognition operations, or reduce a resource usage of at least one of the one or more speech recognition operations.

In at least some embodiments, a method for diagnosing a speech recognition error may include (a) performing at least one first error analysis operation on a speech recognition result generated by a speech recognition component to provide at least one first error analysis result, (b) performing at least one second error analysis operation on the speech recognition result to provide at least one second error analysis result, and (c) based on a combination of at least the first error analysis result and the second error analysis result, determining at least one corrective action to to at least partially increase an operability of at least one speech recognition operation of the speech recognition component.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A system for diagnosing speech recognition errors, comprising:
   at least one processing component; and
   one or more media operably coupled to the at least one processing component and bearing one or more instructions that, when executed by the at least one processing component, perform operations including at least:
   determine that a speech recognition result is at least partially erroneous;
   perform a first error analysis of the at least partially erroneous speech recognition result to provide a first error analysis result;
   perform a second error analysis of the at least partially erroneous speech recognition result to provide a second error analysis result; and
   determine at least one category of recognition error associated with the at least partially erroneous speech recognition result based on a combination of the first error analysis result and the second error analysis result, including determine that the at least one category of recognition error includes at least an acoustic model error when
      (a) the first error analysis result indicates that a reference language model score associated with a reference speech is higher than a recognition language model score associated with the at least partially erroneous speech recognition result; and
      (b) the second error analysis result indicates that a reference acoustic model score associated with the reference speech is lower than a recognition acoustic model score associated with the at least partially erroneous speech recognition result;
   determine at least one corrective action to at least partially correct at least one aspect of a speech recognition component based at least partially on the at least one category of recognition error associated with the at least partially erroneous speech recognition result; and
   at least one of:
      provide an indication of the at least one corrective action; or
      adjust at least one aspect of the speech recognition component based on the at least one corrective action.

2. The system of claim 1, wherein:
   the first error analysis includes at least one language model scoring operation; and
   the second error analysis includes at least one acoustic model scoring operation.

3. The system of claim 1, wherein:
   the first error analysis includes at least one dictionary check operation; and
   the second error analysis includes at least one transcription analysis operation.

4. The system of claim 1, wherein:
   the first error analysis includes at least one emulation operation; and
   the second error analysis includes at least one grammar analysis operation.

5. The system of claim 1, wherein:
   the first error analysis of the at least partially erroneous speech recognition result includes a comparison of a language model score associated with the at least partially erroneous speech recognition result with a language model score associated with a reference speech recognition result; and
   the second error analysis of the at least partially erroneous speech recognition result includes a comparison of an acoustic model score associated with the at least partially erroneous speech recognition result with an acoustic model score associated with the reference speech recognition result.

6. The system of claim 1, wherein at least one of the first error analysis or the second error analysis comprises:
   one or more emulation operations that assume an ideal operation of an acoustic model to assess an actual operation of a language model.

7. The system of claim 1, wherein the operations further comprise:
   perform a third error analysis of the at least partially erroneous speech recognition result to provide a third error analysis result; and
   determine at least one category of recognition error associated with the at least partially erroneous speech recognition result based on a combination of at least the first error analysis result, the second error analysis result, and the third error analysis result.

8. The system of claim 7, wherein:
   the first error analysis includes at least one language model scoring operation;
   the second error analysis includes at least one acoustic model scoring operation; and
   the third error analysis includes at least one of an engine setting check operation, a penalty model setting check operation, a force alignment operation, a 1:1 alignment test operation, an emulation operation, or a dictionary check operation.

9. The system of claim 1, wherein determine at least one corrective action to at least partially correct at least one aspect of a speech recognition component based at least partially on the at least one category of recognition error associated with the at least partially erroneous speech recognition result comprises:
   determine at least one corrective action to at least partially correct at least one aspect of at least one of a language model, an acoustic model, a transcription model, a pruning model, a penalty model, or a grammar of a speech recognition component based at least partially on the at least one category of recognition error associated with the at least partially erroneous speech recognition result.

10. The system of claim 1, wherein provide an indication of the at least one corrective action comprises:
    provide at least one recommended action to at least partially correct at least one aspect of at least one of a language model, an acoustic model, a transcription model, a pruning model, a penalty model, or a grammar of the speech recognition component based at least partially on the at least one category of recognition error associated with the at least partially erroneous speech recognition result.

11. The system of claim 1, wherein adjust at least one aspect of the speech recognition component based on the at least one corrective action comprises:
adjust at least one aspect of at least one of a language model, an acoustic model, a transcription model, a pruning model, a penalty model, or a grammar of a speech recognition component based at least partially on the at least one category of recognition error associated with the at least partially erroneous speech recognition result.

12. A system for diagnosing speech recognition errors, comprising:
at least one processing component; and
one or more media operably coupled to the at least one processing component and bearing one or more instructions that, when executed by the at least one processing component, perform operations including at least:
determine that a speech recognition result is at least partially erroneous;
perform a first error analysis of the at least partially erroneous speech recognition result to provide a first error analysis result;
perform a second error analysis of the at least partially erroneous speech recognition result to provide a second error analysis result;
determine at least one category of recognition error associated with the at least partially erroneous speech recognition result based on a combination of the first error analysis result and the second error analysis result, including determine that the at least one category of recognition error includes at least an acoustic model error and a language model error when
(a) the first error analysis result indicates that a reference language model score associated with a reference speech is lower than a recognition language model score associated with the at least partially erroneous speech recognition result; and
(b) the second error analysis result indicates that a reference acoustic model score associated with the reference speech is lower than a recognition acoustic model score associated with the at least partially erroneous speech recognition result;
determine at least one corrective action to at least partially correct at least one aspect of a speech recognition component based at least partially on the at least one category of recognition error associated with the at least partially erroneous speech recognition result; and
at least one of:
provide an indication of the at least one corrective action; or
adjust at least one aspect of the speech recognition component based on the at least one corrective action.

13. The system of claim 1, wherein determine at least one corrective action to at least partially correct at least one aspect of a speech recognition component comprises determine at least one corrective action to at least partially correct at least one aspect of an acoustic model of the speech recognition component.

14. A system for diagnosing speech recognition errors, comprising:
at least one processing component; and
one or more media operably coupled to the at least one processing component and bearing one or more instructions that, when executed by the at least one processing component, perform operations including at least:
determine that a speech recognition result is at least partially erroneous;
perform a first error analysis of the at least partially erroneous speech recognition result to provide a first error analysis result;
perform a second error analysis of the at least partially erroneous speech recognition result to provide a second error analysis result;
determine at least one category of recognition error associated with the at least partially erroneous speech recognition result based on a combination of the first error analysis result and the second error analysis result, including determine that the at least one category of recognition error includes at least an language model error and a pruning model error when
(a) the first error analysis result indicates that a reference language model score associated with a reference speech is lower than a recognition language model score associated with the at least partially erroneous speech recognition result; and
(b) the second error analysis result indicates that a reference acoustic model score associated with the reference speech is higher than a recognition acoustic model score associated with the at least partially erroneous speech recognition result;
determine at least one corrective action to at least partially correct at least one aspect of a speech recognition component based at least partially on the at least one category of recognition error associated with the at least partially erroneous speech recognition result; and
at least one of:
provide an indication of the at least one corrective action; or
adjust at least one aspect of the speech recognition component based on the at least one corrective action.

15. A system for diagnosing speech recognition errors, comprising:
at least one processing component; and
one or more media operably coupled to the at least one processing component and bearing one or more instructions that, when executed by the at least one processing component, perform operations including at least:
determine that a speech recognition result is at least partially erroneous;
perform a first error analysis of the at least partially erroneous speech recognition result to provide a first error analysis result;
perform a second error analysis of the at least partially erroneous speech recognition result to provide a second error analysis result;
determine at least one category of recognition error associated with the at least partially erroneous speech recognition result based on a combination of the first error analysis result and the second error analysis result, including determine that the at least one category of recognition error includes at least a penalty model error when
(a) the first error analysis result indicates that a reference language model score associated with a reference speech is higher than a recognition language model score associated with the at least partially erroneous speech recognition result; and (b) the second error analysis result indicates that a reference acoustic model score associated with the reference speech is higher than a recognition acoustic model score associated with the at least partially erroneous speech recognition result;

determine at least one corrective action to at least partially correct at least one aspect of a speech recognition component based at least partially on the at least one category of recognition error associated with the at least partially erroneous speech recognition result; and at least one of:
provide an indication of the at least one corrective action; or
adjust at least one aspect of the speech recognition component based on the at least one corrective action.

16. A method for diagnosing speech recognition errors, comprising:
performing one or more speech recognition operations to provide a speech recognition result;
performing a first error analysis of the speech recognition result to provide a first error analysis result;
performing a second error analysis of the speech recognition result to provide a second error analysis result;
determining at least one corrective action to at least partially increase an operability of at least one of the one or more speech recognition operations based on a combination of at least the first error analysis result and the second error analysis result;
determining at least one corrective action to at least partially correct at least one aspect of a speech recognition component based at least partially on at least one category of recognition error associated with the at least partially erroneous speech recognition result, including determining that the at least one category of recognition error includes at least an acoustic model error when
(a) the first error analysis result indicates that a reference language model score associated with a reference speech is higher than a recognition language model score associated with the at least partially erroneous speech recognition result; and
(b) the second error analysis result indicates that a reference acoustic model score associated with the reference speech is lower than a recognition acoustic model score associated with the at least partially erroneous speech recognition result; and
at least one of:
providing an indication of the at least one corrective action; or
adjusting at least one aspect of the speech recognition component based on the at least one corrective action.

17. The method of claim 16, wherein adjusting at least one aspect of the speech recognition component based on the at least one corrective action comprises:
adjusting at least one aspect of at least one of a language model, an acoustic model, a transcription model, a pruning model, a penalty model, or a grammar of a speech recognition component based at least partially on the determined at least one corrective action.

18. The method of claim 16, wherein the one or more instructions are configured wherein:
performing a first error analysis includes at least performing at least one language model scoring operation; and
performing a second error analysis includes at least performing at least one acoustic model scoring operation.

19. The method of claim 16, wherein determining at least one corrective action to at least partially increase an operability of at least one of the one or more speech recognition operations based on a combination of at least the first error analysis result and the second error analysis result comprises:
determining at least one corrective action to at least one of reduce a speech recognition error of at least one of the one or more speech recognition operations, increase a computational efficiency of at least one of the one or more speech recognition operations, or reduce a resource usage of at least one of the one or more speech recognition operations.

20. A system for diagnosing a speech recognition error, comprising:
one or more processing devices that, when configured by one or more executable instructions, are configured as:
circuitry for performing at least one first error analysis operation on a speech recognition result generated by a speech recognition component to provide at least one first error analysis result;
circuitry for performing at least one second error analysis operation on the speech recognition result to provide at least one second error analysis result;
circuitry for determining, based on a combination of at least the first error analysis result and the second error analysis result, that an acoustic model error is indicated when
(a) the first error analysis result indicates that a reference language model score associated with a reference speech is higher than a recognition language model score associated with the at least partially erroneous speech recognition result; and
(b) the second error analysis result indicates that a reference acoustic model score associated with the reference speech is lower than a recognition acoustic model score associated with the at least partially erroneous speech recognition result;
circuitry for determining at least one corrective action to at least partially increase an operability of at least one speech recognition operation of the speech recognition component; and
at least one of:
circuitry for providing an indication of the at least one corrective action; or
circuitry for adjusting at least one aspect of the speech recognition component based on the at least one corrective action.

* * * * *